United States Patent
Nishino

(10) Patent No.: US 7,800,989 B2
(45) Date of Patent: Sep. 21, 2010

(54) DISC-DRIVING APPARATUS AND METHOD FOR CONTROLLING THE SAME

(75) Inventor: Masatoshi Nishino, Chiba (JP)

(73) Assignee: Sony Corporation, Tokyo (JP)

( * ) Notice: Subject to any disclaimer, the term of this patent is extended or adjusted under 35 U.S.C. 154(b) by 1063 days.

(21) Appl. No.: 11/508,844

(22) Filed: Aug. 24, 2006

(65) Prior Publication Data

US 2007/0047405 A1 Mar. 1, 2007

(30) Foreign Application Priority Data

Aug. 31, 2005 (JP) ............................. 2005-252858

(51) Int. Cl.
*G11B 7/00* (2006.01)
(52) U.S. Cl. .............. 369/44.29; 369/44.28; 369/44.41; 369/124.15
(58) Field of Classification Search ........................ None
See application file for complete search history.

(56) References Cited

U.S. PATENT DOCUMENTS 5,251,194 A * 10/1993 Yoshimoto et al. ....... 369/44.26

FOREIGN PATENT DOCUMENTS

| JP | 11-250479 | 9/1999 |
|---|---|---|
| JP | 2005-122869 | 5/2005 |

* cited by examiner

*Primary Examiner*—Muhammad N. Edun
(74) *Attorney, Agent, or Firm*—Oblon, Spivak, McClelland, Maier & Neustadt, L.L.P.

(57) ABSTRACT

A disc-driving apparatus has an optical pickup including an objective lens. The objective lens has an optical axis that is met on a line excluding a central axis of revolution of a disc. The apparatus has storage device that stores plural correction values obtained by detecting fluctuations in amplitude of a tracking error signal with respect to a radial direction of the disc or a quantity of de-tracking with respect to the radial direction thereof. The apparatus has control device that reads the correction value from the storage device and, when the optical pickup is operating, corrects the tracking error signal to conduct servo control based on the corrected tracking error signal.

9 Claims, 19 Drawing Sheets

O: AXIS OF REVOLUTION OF SPINDLE

DISC-DRIVING APPARATUS AND METHOD FOR CONTROLLING THE SAME

CROSSREFERENCE TO RELATED APPLICATION

The present invention contains subject matter related to Japanese Patent Application JP 2005-252858 filed in the Japanese Patent Office on Aug. 31, 2005, the entire contents of which being incorporated herein by reference.

BACKGROUND OF THE INVENTION

1. Field of the Invention

The present invention relates to a disc-driving apparatus and a method for controlling the same that could well be applied to an optical disc-driving apparatus, which has plural objective lenses and a light source producing lights having plural wavelengths, to thereby enable multi-wavelength accommodating recording and reproduction alone.

2. Description of Related Art Recently, an optical disc-driving apparatus has often been used which records an informational signal into a disc-shaped recording medium and reproduces the informational signal from it. Such an optical disc-driving apparatus is equipped with an optical pickup that moves in a radial direction of a disc-shaped recording medium mounted on a disc table to irradiate this disc-shaped recording medium with a laser beam through an objective lens, thereby recording or reproducing an informational signal.

The optical pickup is adjusted for proper focusing by detecting a focusing error signal and displacing the objective lenses based thereon in a direction (focusing direction) tangent to a recording face of a disc-shaped recording medium. Besides, tracking adjustment is performed by detecting a tracking error signal and displacing the objective lenses based thereon in a roughly radial direction (tracking direction) of the disc-shaped recording medium. The tracking error signal is detected by, for example, a differential push-pull (DPP) method.

As for this type of differential push-pull method, Japanese Patent Application Publication No. Hei 3-012830 has disclosed a tracking error detection method. According to this detection method, by arranging a pair of side beams for detection of a tracking error signal on the same side behind or ahead of a main beam in a tracking direction, a difference between them is detected to thereby detect an error. By configuring such a detection method, a tracking error signal can be accurately detected not only in reproduction but also in recording and erasure.

Further, as for detection of a tracking error signal, Japanese Patent Application Publication No. Hei 5-012700 has disclosed an optical head unit. According to this optical head unit, spots of respective two sub-beams have been arranged behind and ahead of a spot of a main beam on an optical disc in such a manner that they may be respectively placed at different edges of a track in which the main beam is displaced. Reflected lights from the two sub-beam spots are used to detect a tracking error signal. By thus configuring an optical head unit, the tracking error signal will encounter no offset at a boundary between a recorded portion and an unrecorded portion of the optical disc, so that tracks can be followed stably.

Furthermore, as for detection of a tracking error signal, Japanese Patent Application Publication No. Hei 6-236567 has disclosed a tracking error detection device and an optical disc apparatus equipped with it. This tracking error detection device has a diffraction grating(s) for generating high-order diffracted light, to irradiate a surface of an optical disc with a total of five optical spots of one main spot plus four side spots and generate two types of tracking error signals from two suites of the side spots so that inter-spot spacing distance in a radial direction of the disc between the suites of the side spots may be set to each inter-track space. By thus configuring a tracking error detection device, it is possible to obtain a good tacking error signal for a plurality of types of optical discs having a large difference in inter-track space.

SUMMARY OF THE INVENTION

Optical pickups employing any of the five-spot DPP methods are assumed to be employed more and more in the future as a three-wavelength accommodating recorder/reproducer or in order to reduce the number of processes of adjustment of a movement mechanism (radial drive: RD). For example, in a case where in an optical disc-driving apparatus, it is seemed to eliminate RD adjustment for reduction of the number of processes in a method for obtaining a tracking error signal by the differential push-pull (DPP) method or it is seemed to realize a three-wavelength accommodating recorder/reproducer that is available for a Blu-ray Disc/DVD/CD, it is considered to employ such a layout as to arrange two objective lenses perpendicular to a direction of a seek axis on the premise that the five-spot DPP method may be employed in an objective lens that is arranged outside a seek axis including a spindle axis of revolution.

If, however, such the method is used, a case where an amplitude of tracking error signal or a quantity of de-tracking may fluctuate depending on a position in a radial direction is assumed. If an amplitude of a tracking error signal fluctuates with a radial direction, it is difficult to regulate a gain of a tracking servo control system to a constant value, so that the tracking servo control system itself or post-seek retraction of the objective lenses by an actuator may be destabilized to have difficulty in realizing any stable performance and high reliabilities in terms of track servo control.

It is desirable to provide a disc-driving apparatus and a method for controlling the same by which even if an optical pickup arranged on a line including no central axis of revolution of a disc has employed the five-spot DPP method, it is possible to obtain any stable performance and reliabilities of track servo control.

According to an embodiment of the present invention, there is provided a disc-driving apparatus having an optical pickup including an objective lens. The objective lens has an optical axis that is met on a line excluding a central axis of revolution of a disc. The disc-driving apparatus also has storage device that stores plural correction values obtained by detecting fluctuations in amplitude of a tracking error signal with respect to a radial direction of the disc or a quantity of de-tracking with respect to the radial direction of the disc. The disc-driving apparatus further has control device that reads the correction value from the storage device and, when the optical pickup is operating, corrects the tracking error signal and conducts servo control based on the corrected tracking error signal.

According to the embodiment of the disc-driving apparatus related to the present invention, storage device stores beforehand plural correction values obtained by detecting fluctuations in amplitude of the tracking error signal with respect to the radial direction of the disc or the quantity of de-tracking with respect to the radial direction of the disc. Based on this premise, the control device reads a correction value from the storage device and, when the optical pickup is operating, corrects the tracking error signal and conducts servo control based on the corrected tracking error signal. Therefore, it is possible to correct the tracking error signal generated by an optical pickup having a seek axis that is met on another line excluding the central axis of revolution in accordance with the five-spot DPP method.

Further, according to another embodiment of the present invention, there is provided a method for controlling a disc-driving apparatus having an optical pickup including an objective lens. The objective lens has an optical axis that is met on a line excluding a central axis of revolution of a disc. The method includes the step of obtaining plural correction values by detecting any one of fluctuations in amplitude of a tracking error signal with respect to a radial direction of the disc and a quantity of de-tracking with respect to the radial direction of the disc. The method also includes the steps of storing the obtained correction values in storage device and reading the correction value from the storage device to correct the tracking error signal when the optical pickup is operating. The method further includes the step of conducting servo control based on the corrected tracking error signal when the optical pickup is operating.

It is thus possible to suppress fluctuations in the amplitude of the tracking error signal or the de-tracking caused by the optical pickups, so that any stable performance and reliabilities about track servo control can be obtained even if an optical pickup is arranged on a line excluding a central axis of revolution.

According to further embodiment of the present invention, there is provided an electronic apparatus has the above disc-driving apparatus and a control section for transmitting a control signal to the disc-driving apparatus.

This enables to be provided a three-wavelength accommodating disc-driving apparatus that is available for a Blu-ray Disc, a DVD and a CD.

The concluding portion of this specification particularly points out and directly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

DESCRIPTION OF THE PREFERRED EMBODIMENTS

The following will describe embodiments of a disc-driving apparatus and a method for controlling the same related to the present invention.

Figure 1:
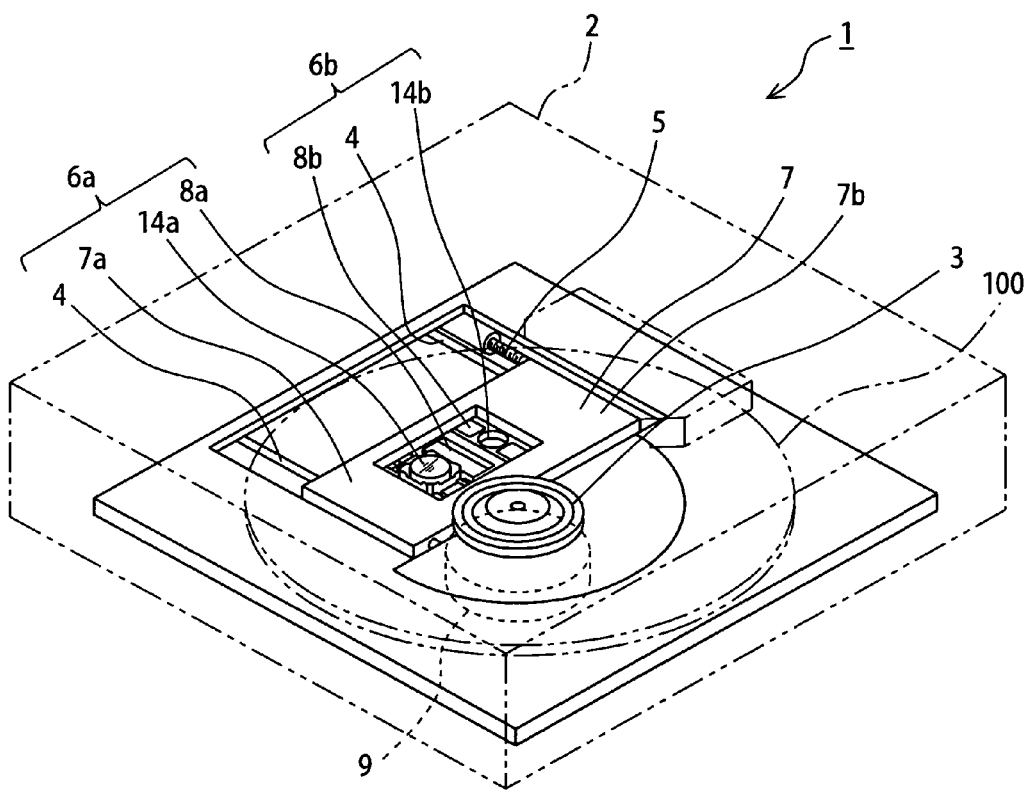
FIG. 1 is a perspective view of an embodiment of an optical disc-driving apparatus according to the present invention for showing a configuration thereof.
Figure 2:
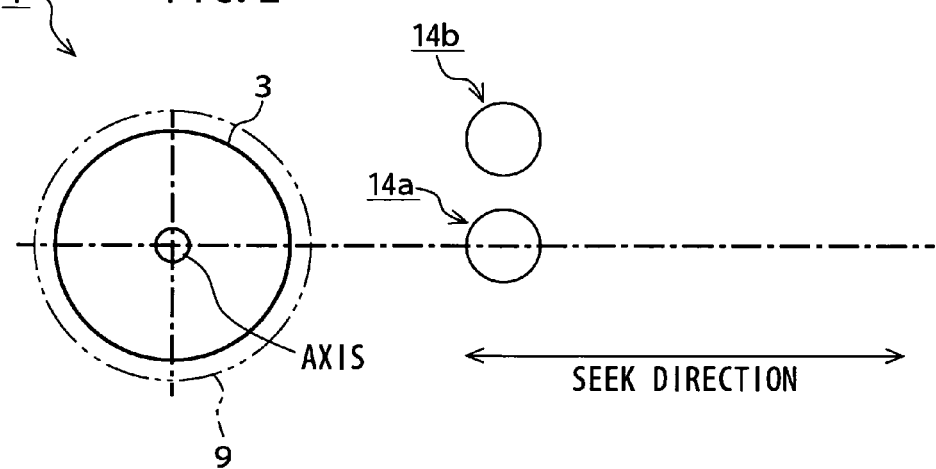
FIG. 2 is a conceptual diagram for showing an example of a layout of two optical pickups.

FIG. 1 shows a configuration of an embodiment of an optical disc-driving apparatus 1 according to the present invention. FIG. 2 shows one example of a layout of two objective lenses 14a and 14b.

The optical disc-driving apparatus 1 shown in FIG. 1 is constituted of a disc-driving apparatus and has a spindle motor 9 and two optical pickups 6a and 6b. The optical pickups 6a and 6b is accommodated to three wavelengths used for Blu-ray Disc, DVD, CD and the like, which provide examples of a disc-shaped recording medium 100. The Blu-ray optical pickup and the DVD/CD optical pickup are completely independent of each other. The first optical pickup 6a has an objective lens 14a and the second optical pickup 6b has an objective lens 14b.

In the first optical pickup 6a, its objective lens 14a is arranged on a scanning line including a central axis of revolution (revolution axis of the disc-shaped recording medium 100) of a spindle motor 9. The first optical pickup 6a moves along a seek axis in a radial direction of a disc. In the second optical pickup 6b, its objective lens 14b is arranged on a scanning line excluding the central axis of revolution of the spindle motor 9. The second optical pickup 6b also moves along the seek axis in the radial direction of the disc (see FIG. 2). At least the optical pickup 6b arranged on the scanning line excluding this central axis of revolution generates a tracking error signal through a five-spot DPP method.

The optical disc-driving apparatus 1 is constituted of necessary members and mechanisms arranged in, for example, a case 2. The case 2 has a disc insertion slot, not shown, formed in it. In the case 2, a chassis, not shown, is arranged in such a configuration that a disc table 3 is fixed (mounted) to a motor shaft of a spindle motor 9 mounted to this chassis. To the chassis, parallel guide shafts 4 and 4 are mounted and a lead screw 5 is supported which is rotated by a sled motor 29.

The optical pickup 6a has a movement base 7, necessary optical elements provided on this movement base 7, and an objective lens driver (hereinafter referred to as "an actuator 8a") arranged on the movement base 7. Bearing portions 7a and 7b provided at opposite ends of the movement base 7 are slidably supported to the guide shafts 4 and 4, respectively. The optical pickup 6b shares the movement base 7 and has necessary optical elements and an objective lens driver (hereinafter referred to as "an actuator 8b") arranged on the movement base 7. A nut member (female screw), not shown, provided on the movement base 7 is screwed to the lead screw 5 (male screw). When the sled motor 29 rotates the lead screw 5, the nut member is fed in a direction corresponding to a revolving direction of the lead screw 5, to move the optical pickup 6a in a radial direction of the disc-shaped recording medium 100 to be mounted to the disc table 3 and move the optical pickup 6b along with the optical pickup 6a in the radial direction thereof. As the disc-shaped recording medium 100, for example, a CD 100a, a DVD 100b, etc. are used.

In the optical disc-driving apparatus 1 thus configured, when the disc table 3 is rotated as the spindle motor 9 revolves, the disc-shaped recording medium 100, that is, the CD 100a or the DVD 100b, mounted to this disc table 3 revolves while the optical pickup 6a is moved simultaneously in a radial direction of the disc-shaped recording medium 100; with the optical pickup 6b being parallel with this, the optical pickup 6b is moved simultaneously in the radial direction of the disc-shaped recording medium 100, so that operations of recording to or reproduction from the disc-shaped recording medium 100 are performed independently.

Figure 3:
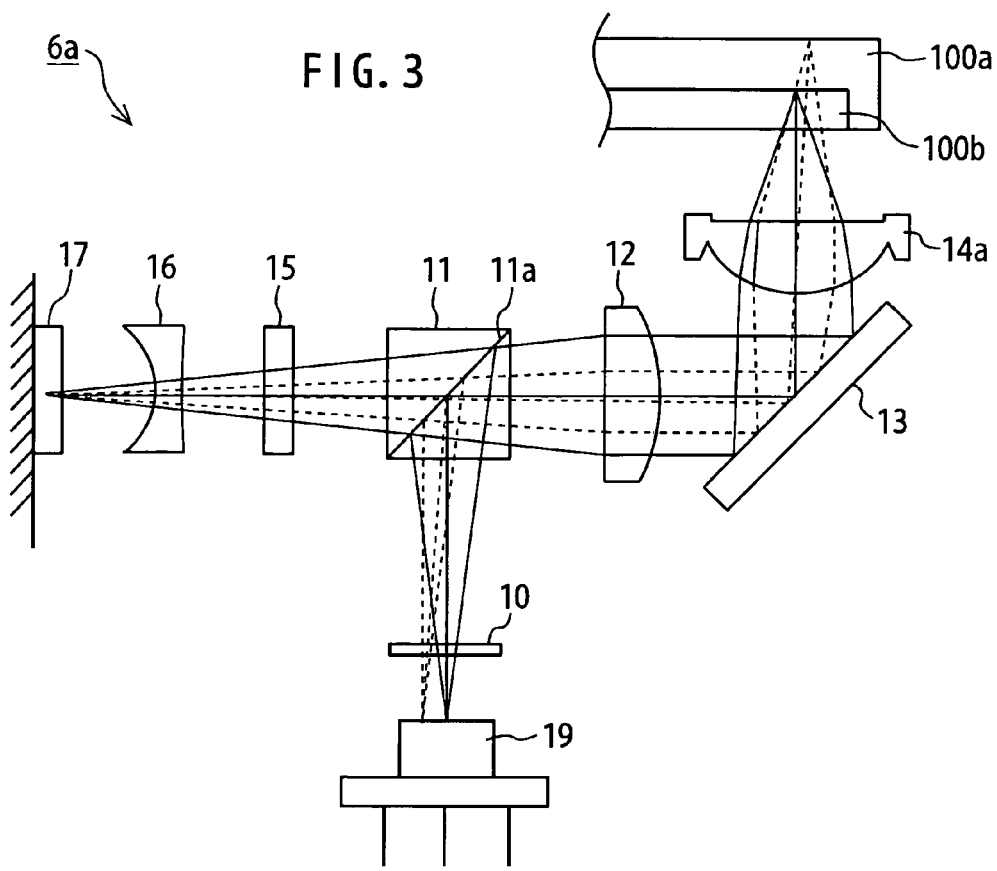
FIG. 3 is a conceptual diagram for showing a configuration of one of the optical pickups.

FIG. 3 shows a configuration of the optical pickup 6a. The optical pickup 6a shown in FIG. 3 has a diffraction grating 10, a beam splitter 11, a collimator lens 12, a rise-up mirror 13, an objective lens 14a, an optical axis composition element 15, an adjustment lens 16, a photoreceptor element 17, and a light-emitting element 19. The diffraction grating 10, the beam splitter 11, the collimator lens 12, the rise-up mirror 13, the optical axis composition element 15, the adjustment lens 16, the photoreceptor element 17, and the light-emitting element 19 are arranged on the movement base 7 while the objective lens 14a is provided to the actuator 8a.

The light-emitting element 19 has two light-emitting spots emitting laser beams having different wavelengths; from the first light-emitting spot, a laser beam having a wavelength (first wavelength) of, for example, 785 nm, is emitted and from the second light-emitting spot, a laser beam having a wavelength (second wavelength) of, for example, 660 nm is emitted.

When an informational signal is recorded to or reproduced from one disc-shaped recording mediums 100, that is, the CD 100a, a laser beam having a wavelength of 785 nm is emitted from the first light-emitting spot. When an informational signal is recorded to or reproduced from the other disc-shaped recording medium 100, that is, the DVD 100b, a laser beam having a wavelength of 660 nm is emitted from the second light-emitting spot.

The first light-emitting spot and the second light-emitting spot of the light emitting element 19 are arranged with any predetermined space therebetween, so that the laser beam emitted from the second light-emitting spot travels along an optical axis of the optical pickup whereas the laser beam emitted from the first light-emitting spot travels off the optical axis of the optical pickup. The beam splitter 11 is of, for example, a reflection type and has a function to reflect a laser beam emitted from the light-emitting element 19 by using a laser beam separation face 11a and guide it to the collimator lens 12 and also to pass therethrough a returned beam of a laser beam reflected by the disc-shaped recording medium 100 and guide it to the optical axis composition element 15. The collimator lens 12 has a function to provide parallel fluxes of a laser beam made incident upon itself. The rise-up mirror 13 has a function to reflect a laser beam and guide it to the objective lens 14 or the collimator lens 12. The objective lens 14a has a function to converge a laser beam entering itself onto a record track of the disc-shaped recording medium 100.

The optical axis composition element 15 has a function to correct an optical axis direction of a laser beam emitted from the first light-emitting spot, which is shifted from the optical axis of the optical pickup, so that the laser beam may impinge on a predetermined photoreceptor spot of the photoreceptor element 17. The adjustment lens 16 is provided to adjust a magnification for a laser beam. The photoreceptor element 17 has three light-receiving areas each for receiving a zero'th-order beam and plus and minus first-order beams, respectively.

In the optical pickup 6a having such a configuration, if the laser beam having a first wavelength of, that is, 785 nm corresponding to the CD 100a is emitted from the light-emitting element 19, the diffraction grating 10 diffracts the laser beam to be split into a main flux, one pair of first sub-fluxes, and one pair of second sub-fluxes.

The diffracted laser beam is reflected by the separation face 11a of the beam splitter 11 to enter the collimator lens 12 where its fluxes are made parallel with each other. The laser beams then rises upward at the rise-up mirror 13 and is irradiated onto a record face of the CD 100a mounted on the disc table 3 via the objective lens 14a. The laser beam with which the record face of the CD 100a has been irradiated is reflected by this record face. Its returned beam passes again through the objective lens 14a, the rise-up mirror 13, and the collimator lens 12 to enter the beam splitter 11. The returned beam thus made incident upon the beam splitter 11 passes through the separation face 11a of the beam splitter 11, enters the optical axis composition element 15 where its optical axis direction is corrected, passes through the adjustment lens 16, and impinges on the photoreceptor element 17 (principle of the five-spot DPP method).

It is to be noted that the optical pickup 6b has a diffraction grating 10, a beam splitter 11, a collimator lens 12, a rise-up mirror 13, an objective lens 14b, an optical axis composition element 15, an adjustment lens 16, a photoreceptor element 17, and a light-emitting element 19. The diffraction grating 10, the beam splitter 11, the collimator lens 12, the rise-up mirror 13, the optical axis composition element 15, the adjustment lens 16, the photoreceptor element 17, and the light-emitting element 19 are arranged on the movement base 7 while the objective lens 14b is provided to an actuator 8b. Since the optical pickup 6b employs the same configuration as that of the optical pickup 6a, its detailed explanation will be omitted.

Figure 4:
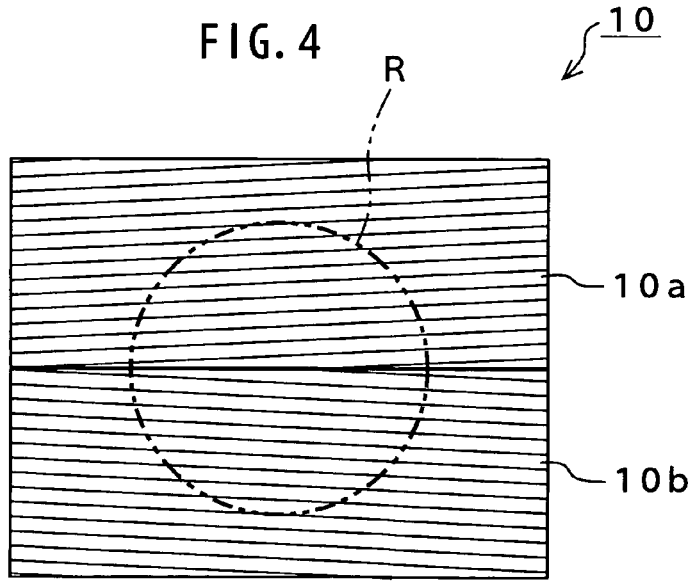
FIG. 4 is a conceptual illustration of a diffraction grating used in any one of the optical pickups.

FIG. 4 illustrates the diffraction grating 10 used in any one of the optical pickups 6a and 6b. The diffraction grating 10 shown in FIG. 4 uses, for example, gratings and is divided into a first region 10a and a second region 10b. A laser beam R impinges upon the gratings over the first region 10a and the second region 10b so that the laser beam made incident upon the first region 10a may be split into a main flux (zero'th-order beam) and one pair of first sub-fluxes (plus and minus first-order beams) and the laser beam made incident upon the second region may be split into a main flux (zero'th-order beam) and one pair of second sub-fluxes (plus and minus first-order beams). It is to be noted that the diffraction grating 10 of the optical pickup 6b has the same configuration as that of the optical pickup 6a and so its explanation will be omitted.

Figure 5:
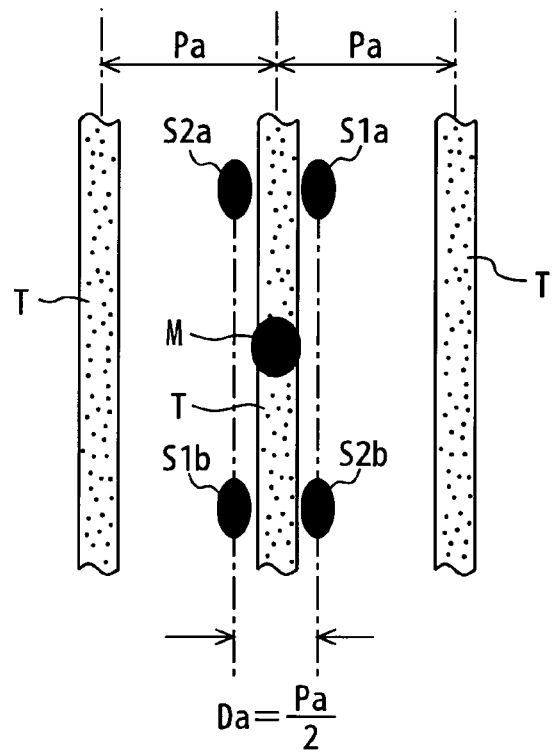
FIG. 5 is a conceptual illustration for showing an example of a relationship between spots of a laser beam corresponding to a CD and a track.

FIG. 5 shows an example of a relationship between spots of a laser beam corresponding to the CD 100a and a track T.

In this example, spacing between one sub-spot and another for the laser beam corresponding to the CD 100a is set to half a track pitch. In the optical pickup 6a, shown in FIG. 3, for reproducing a tracking error signal Ste according to the five-spot DPP method, if supposing a track pitch of the CD 100a shown in FIG. 5 to be Pa, the diffraction grating 10 is designed in such a manner that each of distances Da between centers of sub-spots S1a and S1b of the first sub-fluxes and centers of sub-spots S2a and S2b, respectively, of the second sub-fluxes of the laser beam having the first wavelength may be $(2n-1) \times Pa/2$ approximately, where n is a natural number.

That is, as shown in FIG. 5, the sub-spots S1a and S1b of the first sub-fluxes are symmetrically positioned by 180° with respect to a main spot M. The sub-spots S2a and S2b of the second sub-fluxes are symmetrically positioned by 180° with respect to the main spot M. The sub-spot S1a of the first sub-flux and the sub-spot S2a of the second sub-flux are separated from each other in a radial direction of the CD 100a approximately. The sub-spot S1b of the first sub-flux and the sub-spot S2b of the second sub-flux are similarly separated from each other in the radial direction of the CD 100a approximately. The distance Da between the centers of these sub-spots S1a and S2a and the distance Da between the centers of these sub-spots S1b and S2b are each set to $(2n-1) \times Pa/2$. Therefore, the track pitch of the CD 100s is set to a standard value of about 1.6 μ, so that each distance Da is set to about 0.8 μm (n=1).

If a returned light from the track T of such a disc-shaped recording medium 100 is made incident upon the photoreceptor element 17, the tracking error signal Ste is detected on the basis of the main flux and the sub-fluxes received by the photoreceptor element 17. As described above, the distance Da between the sub-fluxes is set to about half the track pitch Pa, so that a phase of the tracking error signal detected by the sub-spots S1a and S2a is inverted and also a phase of the tracking error signal Ste detected by the sub-spots S1b and S2b is inverted.

Figure 6:
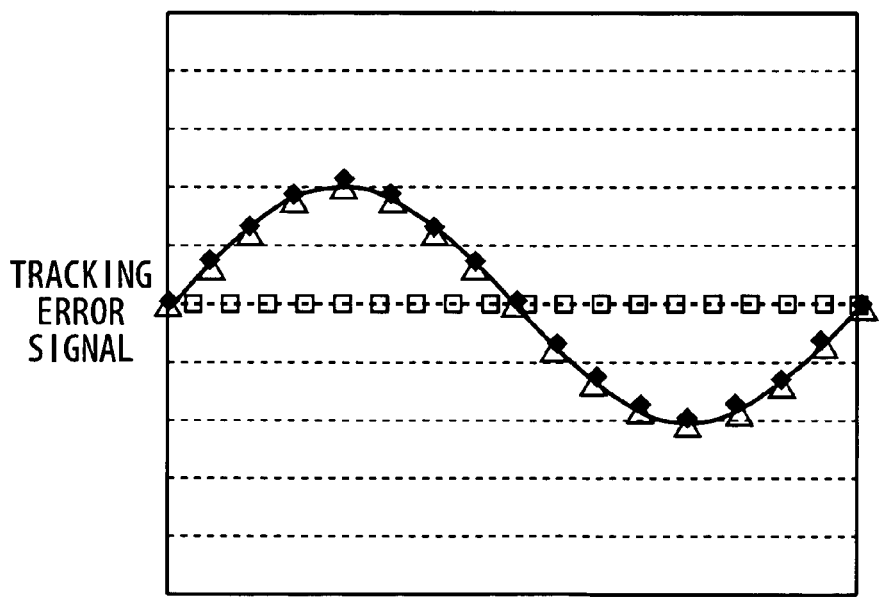
FIG. 6 is a waveform chart for showing an example of reproduction of a tracking error signal by use of a five-spot DPP method.

FIG. 6 shows an example of reproduction of the tracking error signal Ste by use of the five-spot DPP method.

In this case, according to the reproduction example of the tracking error signal Ste by use of the five-spot DPP method, the tracking error signal Ste of the entire sub-fluxes indicated by squares along a broken line shown in FIG. 6 has an amplitude of 0, so that only a DC offset signal that occurs when the objective lens 14a shifts in a tracking direction is detected.

Further, as for a main flux thereof, the tracking error signal Ste indicated by black diamonds along a solid line is detected. Although the DC offset signal may also be detected, by canceling the DC offset signal detected by the sub-fluxes and the DC offset signal detected by the main flux each other, an appropriate tracking error signal Ste can be detected. It is to be noted that the tracking error signal Ste indicated by blank triangles along the bold line is given by the differential push-pull method (DPP method).

This embodiment of the present invention, the five-spot DPP method has been also employed in the optical pickup 6b arranged outside a seek axis. This is because even outside the seek axis, such a merit of the DPP method can be enjoyed that by eliminating a modulation component due to side push-pull (SPP), the tracking error signal Ste has no DC component even if the objective lens 14b fluctuates in a track direction (i.e., even if a field of view fluctuates), which can be realized by only changing a pattern of the diffraction grating 10.

In a method for splitting an optical beam by using the diffraction grating 10, it has been made clear by simulation and actually measured data that a modulated component of a side beam is difficult to be completely eliminated because the side beam has an angle of incidence, if very small, with respect to the objective lens 14b. In this connection, a modulated component of a side beam due to five-spot DPP is about 10-15% of that in a case where the diffraction grating 10 is used in ordinary DPP.

Supposing a push-pull phase of a main beam to be MPP and that of a side beam to be SPP in accordance with the DPP method or the five-spot DPP method, a tracking error (TE) by use of constant k is calculated by the following Equation (1):

$$TE = MPP - k \cdot SPP \quad (1)$$

It, however, has been made clear that in a case where the optical pickup 6b is arranged outside a seek axis, if the push-pull phase SPP, even a little, remains un-removed, a difference between the main beam's push-pull phase MPP and the side beam's push-pull phase SPP fluctuates with radial positions and, therefore, the tracking error TE also fluctuates correspondingly. As an example of actual fluctuations, its data is shown in FIG. 7A.

Figure 7A:
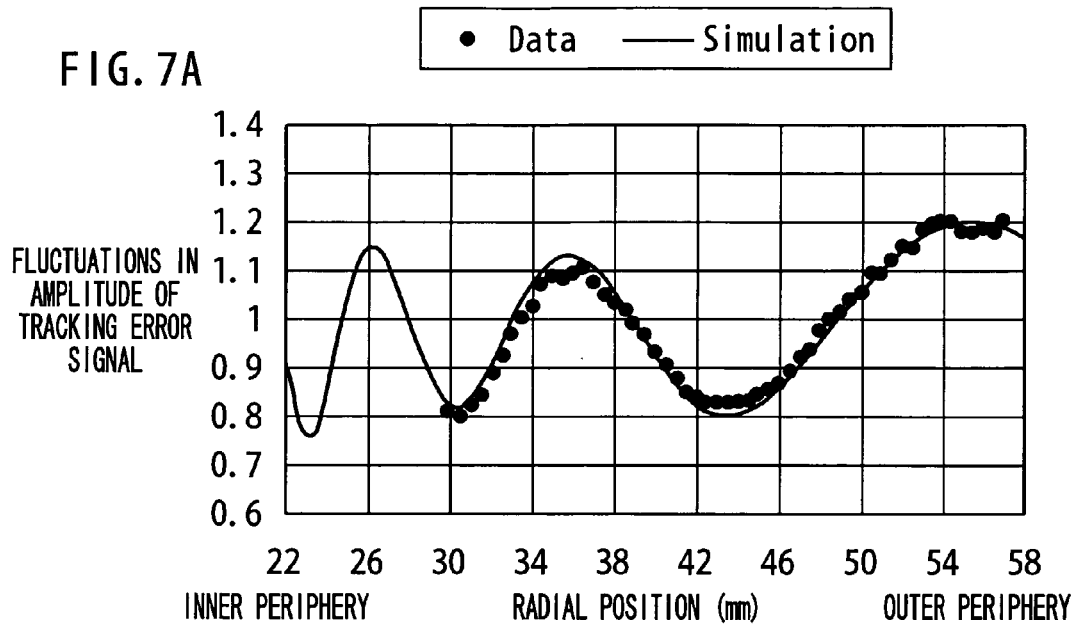
FIG. 7A is a waveform chart for showing an example of fluctuations in amplitude of a tracking error signal versus disc radial positions and FIG. 7B is a drawing for showing an example of a seek position.
Figure 7B:
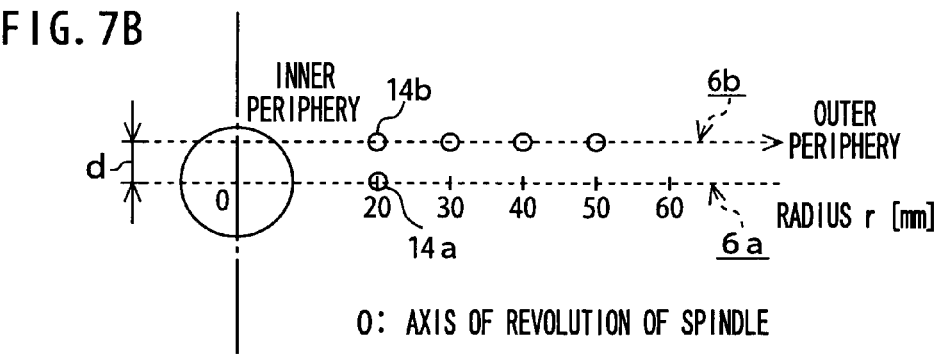

FIG. 7A shows an example of fluctuations in amplitude of a tracking error signal versus disc radial positions and FIG. 7B shows an example of a seek position. In FIG. 7A, a horizontal axis represents a disc radial position in millimeter units. Its vertical axis represents a quantity of the fluctuation in amplitude of a tracking error signal in the optical pickup 6b. In the figure, a plot of solid circles represents actually measured data and a solid line represents a result of simulation. In this example, it can be seen that the amplitude of tracking error signal fluctuates by about ±20% over a distance from an inner periphery (radial position=22 mm) to an outer periphery (radial position=58 mm).

It has been made clear through simulation and actual measurement that a fluctuation level of amplitude of this tracking error signal, its fluctuation cycle, etc. fluctuates due to a variety of following factors related to the optical pickup 6b and the drive:

(i) distance (beam spacing) between a main beam and a side beam on the disc-shaped recording medium 100; (ii) a position accuracy of the diffraction grating 10; (iii) a difference in phase at the time of adjustment of a main beam and a side beam; and (iv) a position of an optical axis of the objective lens 14b arranged outside the seek axis, that is, a distance from a spindle (central axis).

Regarding the above factors of (i), (ii), and (iii), any fluctuation occurs during manufacturing of the optical pickup 6b while regarding the above factor of (iv), any fluctuation occurs when the optical pickup 6b is incorporated into the drive mechanism in addition to the fluctuations of the optical pickup 6b itself.

FIG. 7B shows an example of seek positions for the optical pickup 6b. An optical axis of the objective lens 14b shown in FIG. 7B is set so as to be away from an optical axis of the objective lens 14a by distance of d. For example, points where track bias correction values Ad are to be acquired are set to various points obtained by dividing by nine a distance between a maximum seek position of the outer periphery (58 mm) and a minimum seek position of the inner periphery (22 mm) of the optical pickup 6b into equal space (e.g., 4 mm). Of course, the present invention is not limited to it.

Next, the following will describe the optical disc-driving apparatus 1 having its tracking error correcting function in which the objective lens 14b of the optical pickup 6b is mounted outside a seek axis.

Figure 8:
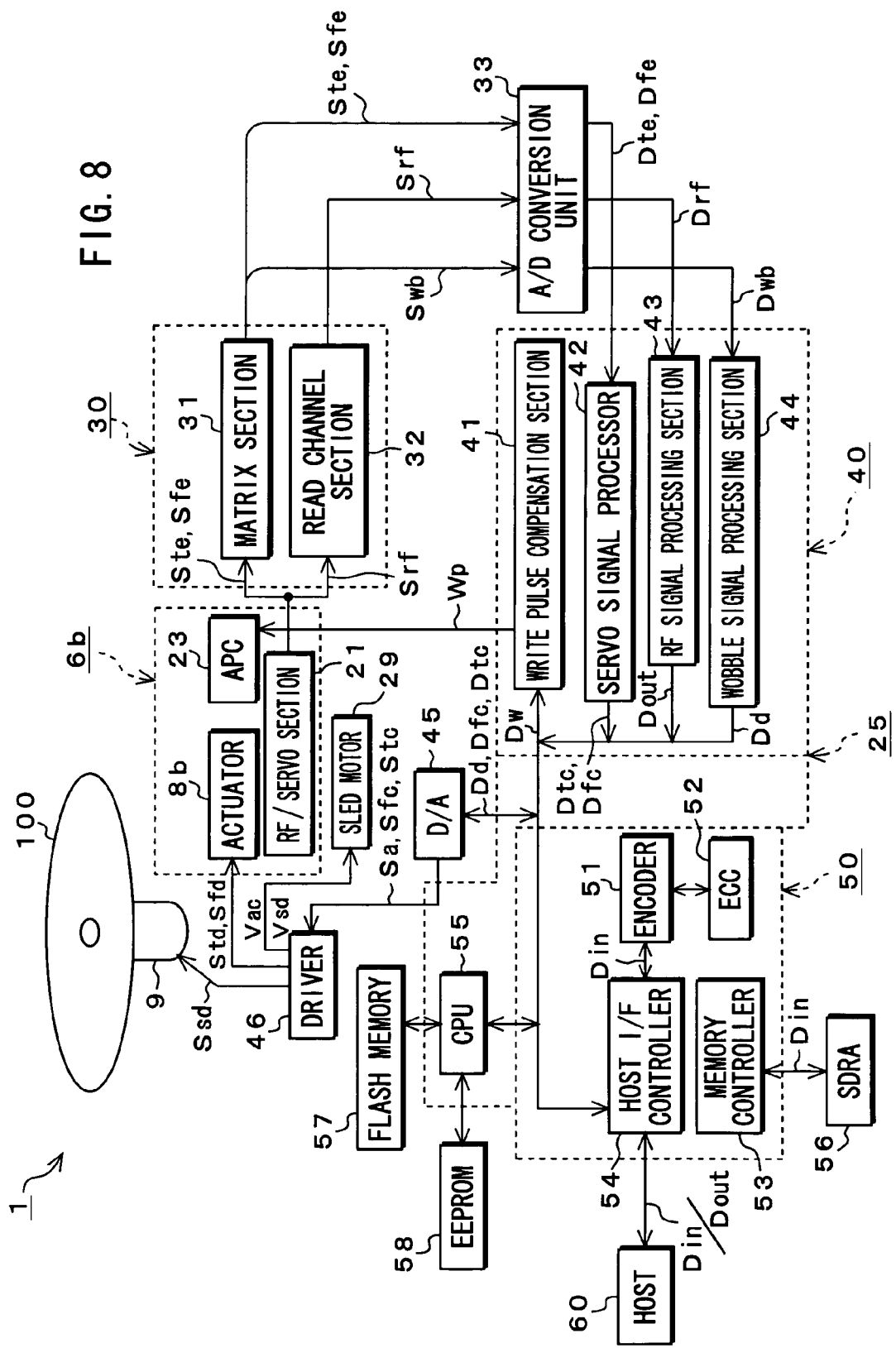
FIG. 8 is a block diagram for showing a configuration of a control system in the optical disc-driving apparatus.

FIG. 8 shows a configuration of a control system in the optical disc-driving apparatus 1. The optical disc-driving apparatus 1 shown in FIG. 8 drives the optical pickup 6b arranged outside a seek axis in accordance with the five-spot DPP method. The optical disc-driving apparatus 1 has a function to correct the tracking error signal Ste. Explanation of the optical pickup 6a will be omitted.

The optical disc-driving apparatus 1 has the optical pickup 6b, the spindle motor 9, a control device 25, an analog signal processing unit 30, an A/D conversion unit 33, a D/A conversion unit 45, a driver 46, an SDRA (SDRAM) 56, a flash memory 57, and an EEPROM 58. The control device 25 has a servo DSP 40, a disc controller 50, and a CPU 55.

The optical pickup 6b is used to read or record data from or into the disc-shaped recording medium 100 and has the actuator 8b shown in FIG. 1, the photoreceptor element 17, the light-emitting element 19, an RF/servo section 21, and an APC section 23. The actuator 8b drives the objective lens 14b in a two-axis (X, Y) direction based on an actuator drive voltage. The RF/servo section 21 is connected to the photoreceptor element 17, not shown, to detect a disc reproduction signal such as a tracking error (servo) signal Ste and a focus error signal Sfe. The APC section 23 automatically controls power of the light-emitting element 19 such as a semiconductor laser based on a write pulse signal Wp.

The RF/servo section 21 is connected to the analog signal processing unit 30 which is an integrated circuit to perform analog processing on a disc reproduction signal read or recorded by the optical pickup 6a or 6b. The analog signal processing unit 30 has a matrix section 31 and a read channel section 32. The matrix section 31 is connected to the RF/servo section 21, to separate the tracking error signal Ste, a wobble signal Swb, etc. from a disc reproduction signal and amplifies them.

The tracking error signal Ste is a sine wave signal corresponding to one cycle from one pregroove to the next pregroove in the track T. The matrix section 31 is equipped with a track counter, not shown, to count the number of times of crossing the tracking error signal Ste over zero, thereby measuring the number of tracks passed over. By using this track counter, a position of a laser beam spot on a disc can be detected to an accuracy of one track. The read channel section 32 separates an RF signal (recording/reproduction signal) Srf from the disc reproduction signal and outputs it.

The matrix section 31 and the read channel section 32 are connected to which the A/D conversion unit 33 where the tracing error signal Ste, the wobble signal Swb, the RF signal Srf, etc. are converted into digital signals and outputs tracking error data Dte, wobble data Dwb, read (RF) data Drf, etc. respectively.

To the A/D conversion unit 33, the servo DSP 40 constituting the control device 25 is connected. The servo DSP 40 has a write pulse compensation section 41, a servo signal processor 42, an RF signal processing section 43, and a wobble signal processing section 44.

The write pulse compensation section 41 controls the APC section 23 in the optical pickup 6a or 6b. For example, the write pulse compensation section 41 generates a write pulse signal (laser drive signal) Wp based on write data Dw received from the disc controller 50 and supplies the write pulse signal Wp to the light-emitting element 19 (laser diode) in the optical pickup 6a or 6b. In this case, the write pulse compensation section 41 compensates a signal level of the write pulse signal Wp in accordance with characteristics of a recording layer of the disc-shaped recording medium 100, a spot shape of a laser beam, a recording linear velocity, etc. based on a power compensation signal from the disc controller 50, to optimize power of a laser beam emitted from the light-emitting element 19 in the optical pickup 6a or 6b, thus recording the signal. The disc-shaped recording medium 100 is irradiated by the optical pickup 6a or 6b with a laser beam whose beam quantity being controlled. The laser beam reflected by the disc-shaped recording medium 100 is detected by the photoreceptor element 17 in the optical pickup 6a or 6b (see FIG. 3).

The servo signal processor 42 generates tracking control data Dtc based on tracking error data Dte received from the A/D conversion unit 33 and supplies it to the D/A conversion section 45. The tracking control data Dtc is used to control the objective lens 14b in the optical pickup 6b in such a manner that a laser beam irradiation position may come to a middle position of a desired track T. Further, the servo signal processor 42 generates focus control data Dfc based on focus error data Dfe received from the A/D conversion unit 33, to control the objective lens 14b in the optical pickup 6b in such a manner that a laser beam focal point may come to a position of the recording layer of the disc-shaped recording medium 100 and supplies this data to the D/A conversion section 45.

The RF signal processing section 43 asymmetrically corrects RF data Drf received from the A/D conversion unit 33 and supplies it as read data Dout to the disc controller 50. Further, the RF signal processing section 43 generates a clock signal synchronized with this read data Dout and supplies it to the disc controller 50.

The wobble signal processing section 44 performs signal processing on wobble data Dwb, to output absolute time in pre-groove (ATIP) synchronization detection data Dd. The ATIP synchronization detection data Dd is used to detect ATIP information. The ATIP information is of time axis information and written as absolute time information on a disc from an inner-periphery side start position to the outer periphery in a signal recording region (program region) of the disc-shaped recording medium 100. This ATIP information is written during a stage of processing a CD-R or a CD-RW. To write the ATIP information to the disc-shaped recording medium 100 such as a CD-R or a CD-RW, a modulation method referred to as bi-phase is employed.

The wobble signal processing section 44 has, for example, an ATIP decoding function. The wobble data Dwb passes through a band-pass filter, not shown, where its band is limited so as to remove a wobble component and such a wobble component as to be caused by a following side spot. The thus band-limited wobble data Dwb undergoes waveform shaping so that subsequently a carrier clock signal synchronized with a carrier component may be generated.

By using the thus generated carrier clock signal, wobble information obtained by binarizing a preceding wobble component is demodulated to generate a bi-phase signal and a bi-phase clock signal synchronized with this bi-phase signal. This generated bi-phase signal is demodulated on the basis of the bi-phase clock signal, thereby generating a pre-format address. Further, the wobble signal processing section 44 detects a synchronization pattern of the pre-format address to generate ATIP synchronization detection data Dd. The wobble signal processing section 44 supplies pre-format address to the disc controller 50 and the ATIP synchronization detection data Dd to the D/A conversion section 45, respectively.

The D/A conversion section 45 performs digital/analog conversion on the ATIP synchronization detection data Dd to output an ATIP synchronization detection signal Sa to the driver 46. Further, the D/A conversion section 45 performs digital/analog conversion on the focus control data Dfc to output a focus control signal Sfc to the driver 46 and performs digital/analog conversion on the tracking control data Dtc to output a tracking control signal Stc to the driver 46.

The driver 46 generates a spindle motor drive signal Ssd based on the ATIP synchronization detection signal Sa and supplies the spindle motor drive signal Ssd to the spindle motor 9. Thus, the spindle motor 9 revolves the disc-shaped recording medium 100 at a predetermined speed. It is to be noted that the spindle motor 9 revolves the disc-shaped recording medium 100 so that it may reach the predetermined speed, based on the spindle drive signal Ssd.

Further, the driver 46 generates a focus drive signal Sfd based on the focus control signal Sfc and also generates a tracking drive signal Std based on the tracking control signal Stc. These generated focus drive signal Sfd and tracking drive signal Std are supplied to the actuator 8b in the optical pickup 6b to control a position of the objective lens 14b, thereby conducting any control so that a laser beam may come to a middle position of a desired track.

The disc controller 50 constitutes the control device 25 and has an encoder 51, an ECC section 52, a memory controller 53, and a host I/F controller 54. The disc controller 50 performs EFM demodulation on the read data Dout and also performs de-interleave processing by use of a general-purpose memory (RAM etc.), not shown, and error correction processing by use of cross interleave reed-Solomon code (CIRC). Furthermore, a sink pattern is detected, to perform descramble processing or to perform error correction processing etc. at the error correcting code (ECC) section 52. In this case, the read data Dout after having undergone the error correction processing is stored in an SDRA 56 as a buffer memory and then supplied as reproduction data to an external host computer 60 etc. via the host I/F interface 54.

Further, the disc controller 50 detects a frame synchronization signal from the EFM-demodulated data and supplies this frame synchronization signal to the above-described driver 46. The driver 46 generates the spindle drive signal Ssd used to revolve the disc-shaped recording medium 100 at a desired speed, by using the ATIP synchronization detection data Dd received from the wobble signal processing section 44 when recording a signal to the disc-shaped recording medium 100 and also by using frame synchronization data received from the disc controller 50 or the ATIP synchronization detection data Dd received from the wobble signal processing section 44 when reading information from the disc-shaped recording medium 100. Supplying the spindle motor 9 with the spindle drive signal Ssd generated by the driver 46 allows the disc-shaped recording medium 100 to be revolved at a desired speed.

Furthermore, when supplied with record data Din via the host I/F controller 54 from the external host computer 60, the disc controller 50 temporarily accumulates this record data Din in the SDRA 56 and reads this accumulated record data Din so that this data may be encoded into a predetermined sector format by the encoder 51 and given an error correction ECC by the ECC section 52. Furthermore, the disc controller 50 performs CIRC encoding processing, EFM modulation processing, etc. to generate write data Dw. This generated write data Dw is supplied to the write pulse compensation section 41.

To the above-described host I/F controller 54, the CPU 55 is connected. The CPU 55 is connected to the flash memory 57 that stores an operation control program. The CPU 55 reads the operation control program from the flash memory 57 and, based on it, controls operations of the optical disc-driving apparatus 1. For example, the CPU 55 determines a reproduction position, a recording position, etc. on the disc-shaped recording medium 100 based on a sub-code signal generated by the disc controller 50 or a pre-format address from the wobble signal processing section 44, to supply the servo control signal to the servo DSP 40 or the disc control signal etc. to the disc controller 50, thereby recording and reproducing data.

To the CPU 55, besides the flash memory 57, the EEPROM 58, which is one example of nonvolatile storage device, is connected so as to store plural correction values obtained by detecting a fluctuation in amplitude of the tracking error signal Ste with respect to a radial direction of the disc-shaped recording medium 100 or a quantity of de-tracking with respect to a radial direction of the disc-shaped recording medium 100.

The CPU 55, which constitutes the control device 25, corrects the tracking error signal Ste at the time of an actuation operation of the optical pickup 6b based on the correction value and, based on the corrected tracking error signal Ste, conducts servo control. In actuation operation, the CPU 55 reads from the EEPROM 58 a correction value that corresponds to an address of the disc-shaped recording medium 100 to be accessed and notifies the servo DSP 40 of the correction value. For example, the servo DSP 40 has the servo signal processor 42, to correct the received tracking error signal Ste based on the correction value during an actuation operation of the optical pickup 6b, thereby conducting servo control based on the corrected tracking error signal Ste.

Next, the following will describe a method for correcting an tracking error in the optical disc-driving apparatus 1 mounting the optical pickup 6b outside its seek axis.

In this embodiment, in a case where the objective lens 14a in the optical pickup 6a is arranged on a scanning line including the central axis of revolution of the spindle motor 9 while the objective lens 14b in the optical pickup 6b is arranged on a scanning line excluding the central axis of revolution of the spindle motor 9 so that the optical pickup 6b moving in a disc radial direction along the seek axis may generate the tracking error signal Ste according to the five-spot DPP method, fluctuations in amplitude of the tracking error signal Ste caused depending on radial positions of the disc-shaped recording medium 100, and de-tracking quantity, etc. are corrected using at least two correction coefficients for each of the drivers 46.

First Embodiment

Figure 9:
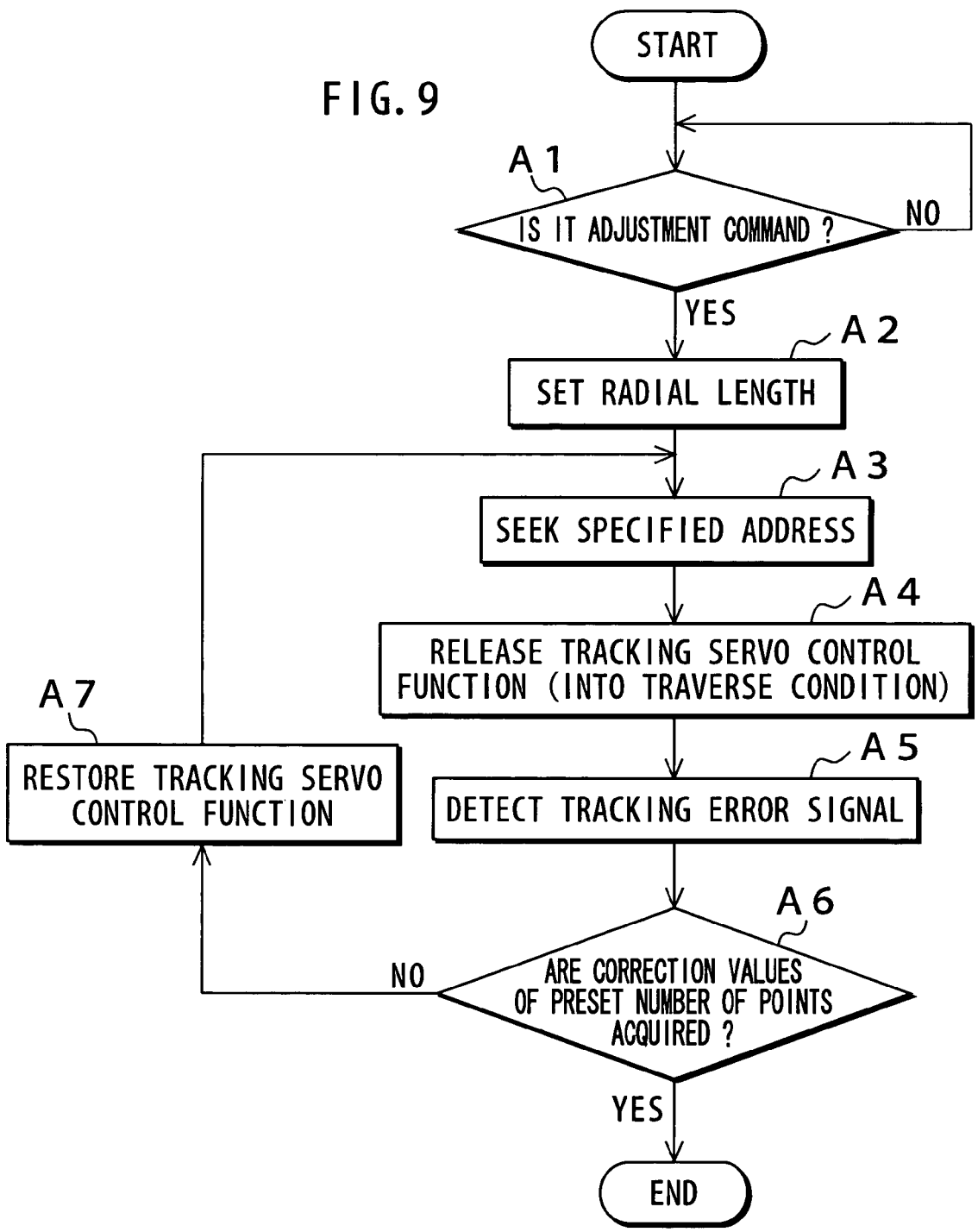
FIG. 9 is a flowchart for showing an example of control in adjustment of the optical pickup according to a first embodiment.
Figure 10:
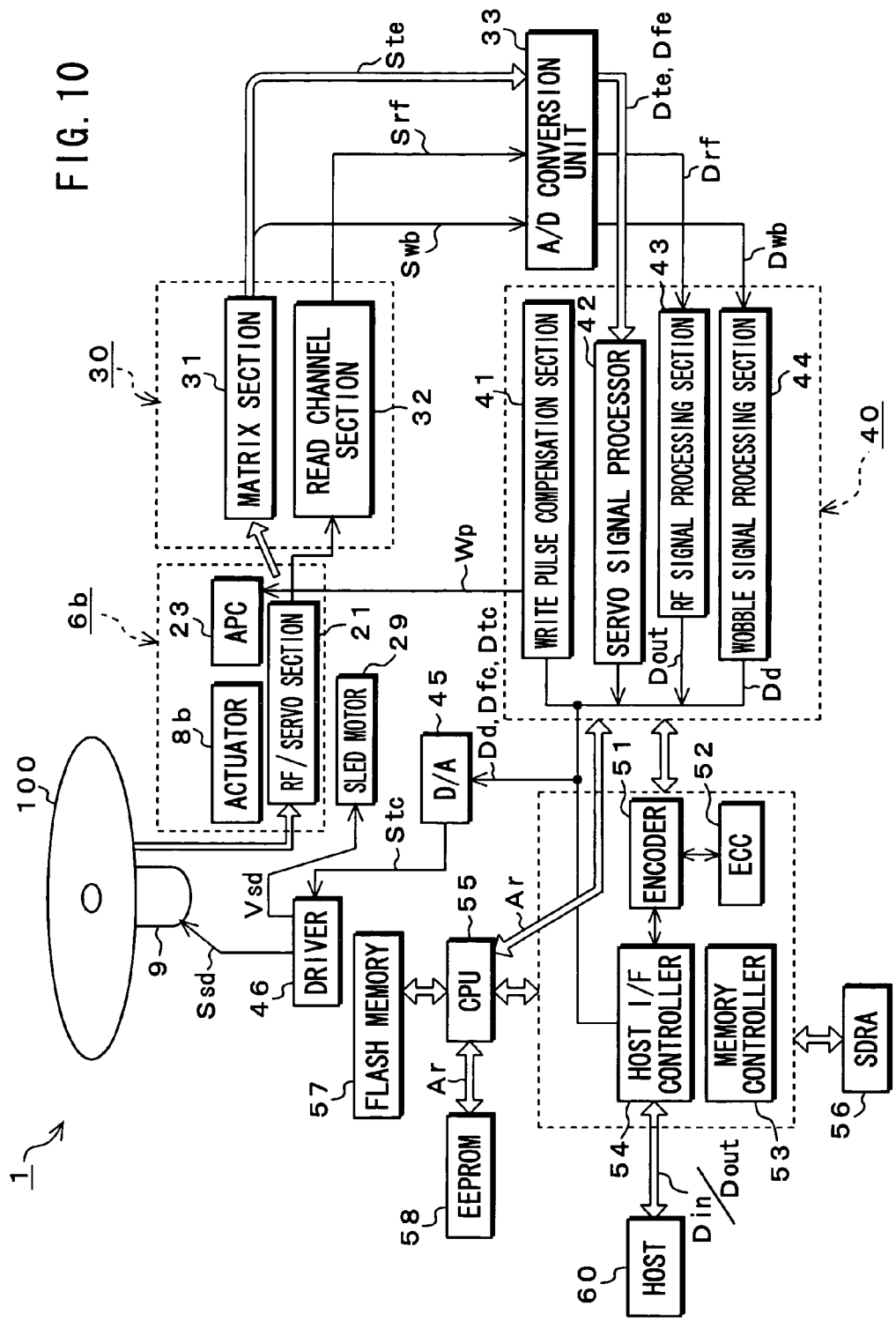
FIG. 10 is a block diagram for showing a flow of data during a process of that adjustment.

FIG. 9 is a flowchart for showing an example of control in adjustment of the optical pickup 6b according to the first embodiment. FIG. 10 is a block diagram for showing a flow of data during a process of that adjustment.

In the present embodiment, fluctuation factors (i) through (iv) described relative to FIG. 7 such as fluctuation level of amplitude of a tracking error signal and its fluctuation cycle are peculiar to each drive unless characteristics of an optical pickup 6b change. Based on this premise, in a process of adjusting the optical pickup 6b when the drive is being manufactured, fluctuations in amplitude of the tracking error signal Ste with respect to the radial direction of the disc-shaped recording medium 100 are detected (grasped) so that a correction value Ar (coefficient) may be acquired from the fluctuations thus detected in amplitude thereof.

As for the tracking error signal Ste, a radial length is divided into segments each having equal interval and points corresponding to the segments are set (fixed) to acquire each correction value Ar. For example, points where the correction values Ar are to be acquired are set so as to correspond to each of the points obtained by dividing by N a distance between an outer periphery maximum seek position and an inner periphery minimum seek position for the optical pickup 6b into segments each having equal space (equal interval). An address is assigned to each of these points. In this embodiment, such an example is enumerated that a correction value Ar as for the tracking error signal Ste may be acquired for each unit interval.

Based on the premise thereof, at step A1 of the flowchart shown in FIG. 9, the process first waits for an adjustment command for the optical pickup 6b. The adjustment command is notified, for example, to the CPU 55 from the host computer 60 shown in FIG. 10. If the adjustment command is sent from the host computer 60 to the CPU 55, the process goes to step A2 where the CPU 55 performs setting on the radial length. In this setting, for example, a correction value acquisition point is set to each of the points obtained by evenly dividing by N a distance between an outer periphery maximum seek position and an inner periphery minimum seek position for the optical pickup 6b.

Next, the process goes to step A3 where the CPU 55 seeks a specified address in condition where a tracking servo control function is activated. For example, the CPU 55 controls the sled motor 29 to drive based on an initial setting so that the optical pickup 6b may be sought to an address that corresponds to a desired radial position. In this case, the servo signal processor 42 shown in FIG. 10 outputs to the D/A conversion section 45 tracking control data Dtc used to control the objective lens 14b in the optical pickup 6b so that a laser beam irradiation position thereby may come to a middle position of a desired track T. The D/A conversion section 45 performs digital/analog conversion on the tracking control data Dtc to output a tracking control signal Stc to the driver 46.

The driver 46 generates a sled drive voltage Vsd based on the tracking control signal Stc and supplies this sled drive voltage Vsd to the sled motor 29. The sled motor 29 moves the optical pickup 6b based on the sled drive Vsd and stops it at a specified position (address). The actuator 8b drives the objective lens 14b in a two-axis (X, Y) direction based on an actuator drive voltage received from the driver 46. Thus, the optical pickup 6b is controlled into such condition that data can be read from the disc-shaped recording medium 100. The APC section 23 automatically controls power of the light-emitting element 19 based on a write pulse signal Wp. Further, the driver 46 generates a focus drive signal Sfd based on a focus control signal Sfc and supplies this focus control signal Sfd to the actuator 8b in the optical pickup 6b, thereby controlling a position of the objective lens 14b so that a laser beam spot thereof may be focused to a middle position of a desired track T.

Next, at step A4, the CPU 55 notifies the servo DSP 40 of a command that releases a tracking servo control function thereof. When receiving this notification, for example, the signal processor 42 releases the tracking servo control function to put the objective lens 14b into its traverse condition. In this specification, the traverse condition refers to a condition where a tracking servo control loop is opened, so that a laser beam spot is stretched over the tracks T without failing to follow the track. The servo DSP 40 acquires an amplitude value of the tracking error signal Ste in this condition.

Next, the process goes to step A5 where, for example, the RF/servo section 21 shown in FIG. 10 detects the tracking error signal Ste and outputs it to the A/D conversion unit 33 via the matrix section 31 in the analog signal processing unit 30. The A/D conversion unit 33 performs analog/digital conversion on the tracking error signal Ste and outputs tracking error data Dte to the servo signal processor 42.

The servo signal processor 42 saves in a nonvolatile memory an amplitude value of the tracking error data Dte in the traverse condition or a correction value Ar thereof. Supposing, in this case, the amplitude value of the tracking error data Dte to be St and a reference amplitude value of the tracking error data provided to the servo signal processor 42 to be Sr, the correction value Ar of the tracking error data Dte is computed by the following Equation (2):

$$Ar = Sr/St \qquad (2)$$

This computation is performed by the CPU 55 or the servo signal processor 42. For example, the correction values Ar (coefficient) computed by the servo signal processor 42 are respectively written into the EEPROM 58 shown in FIG. 10. The EEPROM 58 is a rewritable memory whose data is not lost even if power is turned off. It is to be noted that if the servo signal processor 42 is configured to perform the above computation, control burdens on the CPU 55 are mitigated.

Next, the process goes to step A6 where the CPU 55 decides whether the correction values Ar are acquired by as much as a preset number of points. If they come short of that preset number of points, the process goes to step A7 to restore the tracking servo control function, thereby putting the objective lens 14b into the non-traverse condition. In the present specification, the non-traverse condition refers to a condition where the tracking servo control loop is closed and a laser beam spot follows the track T. Then, the process returns to step A3 to continue processing for acquiring the correction value(s) Ar. These operations are repeated as many as the preset number of acquired points for correction.

If the correction values Ar are reached to the preset number of points at the above-described step A6, the process ends the processing to acquire the correction values Ar of the tracking error data Dte. Accordingly, if the optical pickup 6b generates the tracking error signal Ste according to the five-spot DPP method, it is possible to acquire plural correction values Ar based on fluctuations in amplitude of the tracking error signal Ste generated in accordance with radial positions (with respect to a radial direction) of the disc-shaped recoding medium 100.

Figure 11:
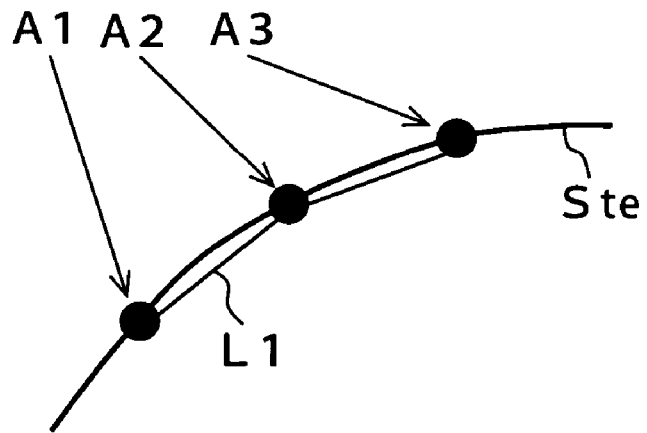
FIG. 11 is a conceptual illustration for showing an example (No. 1) of correction of a tracking error signal Ste when the optical pickup is actually operating.

FIG. 11 shows an example (No. 1) of correction of the tracking error signal Ste when the optical pickup 6b is actually operating.

In the present embodiment, an optical disc-driving apparatus 1 has a function to correct fluctuations in amplitude of the tracking error signal Ste with respect to a radial direction owing to mounting of the optical pickup 6b outside a seek axis. The fluctuations in amplitude of the tracking error signal Ste are corrected on the side of a drive.

A curve shown in FIG. 11 indicates a portion extracted from a result of simulation on the tracking error signal Ste of the optical pickup 6b, to which solid circles each representing data actually measured during a process of adjusting it are superimposed. On each of the points A1 through A3 corresponding to the solid circles, the correction value Ar is acquired. The correction value Ar is used between the two adjacent points, for example, A1 and A2, which is obtained by approximating a curve segment between two adjacent points A1 and A2 using a line L1 to interpolate (calculate) the correction value Ar along the line L1.

Of course, the present invention is not limited to it; relative to a correction value Ar to be notified to the servo DSP 40 from the CPU 55, the correction value Ar calculated not only by the linear approximation method by use of correction values Ar of two adjacent points shown in FIG. 11 but also by approximating the curve itself can be applied.

Figure 12:
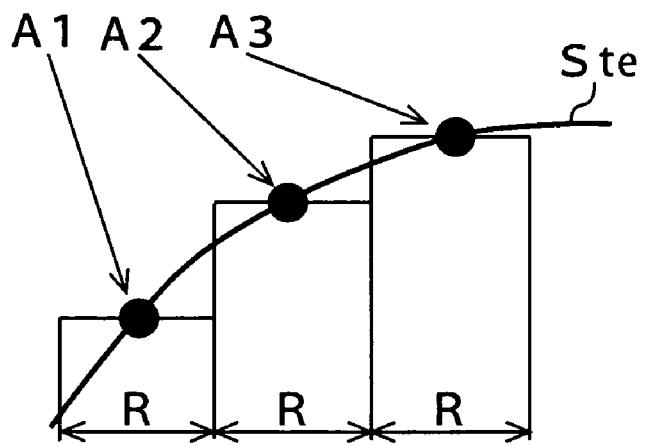
FIG. 12 is a conceptual illustration for showing an example (No. 2) of correction of the tracking error signal Ste when the optical pickup is actually operating.

FIG. 12 shows an example (No. 2) of correction of the tracking error signal Ste by approximating the curve when the optical pickup 6b is actually operating. A curve shown in FIG. 12 indicates an extracted portion of a curve of the tracking error signal Ste of the optical pickup 6b when the optical pickup 6b is actually operating, to which solid circles each representing data actually measured during a process of adjusting it are superimposed. On each of the points A1 through A3 corresponding to the solid circles, the correction value Ar is acquired. An application range R of the correction value Ar at each point is set stepwise between two adjacent points. In other words, during a width of a step set to each of the points, A1 through A3, for acquiring the correction value, the correction value Ar is applied. Thus, correcting, on the driver side, the tracking error signal Ste when the optical pickup 6b is actually operating allows any stable performance and reliabilities to be realized for tracking servo control even if the objective lens 14b is arranged on a scanning line excluding the central axis of revolution.

Figure 13:
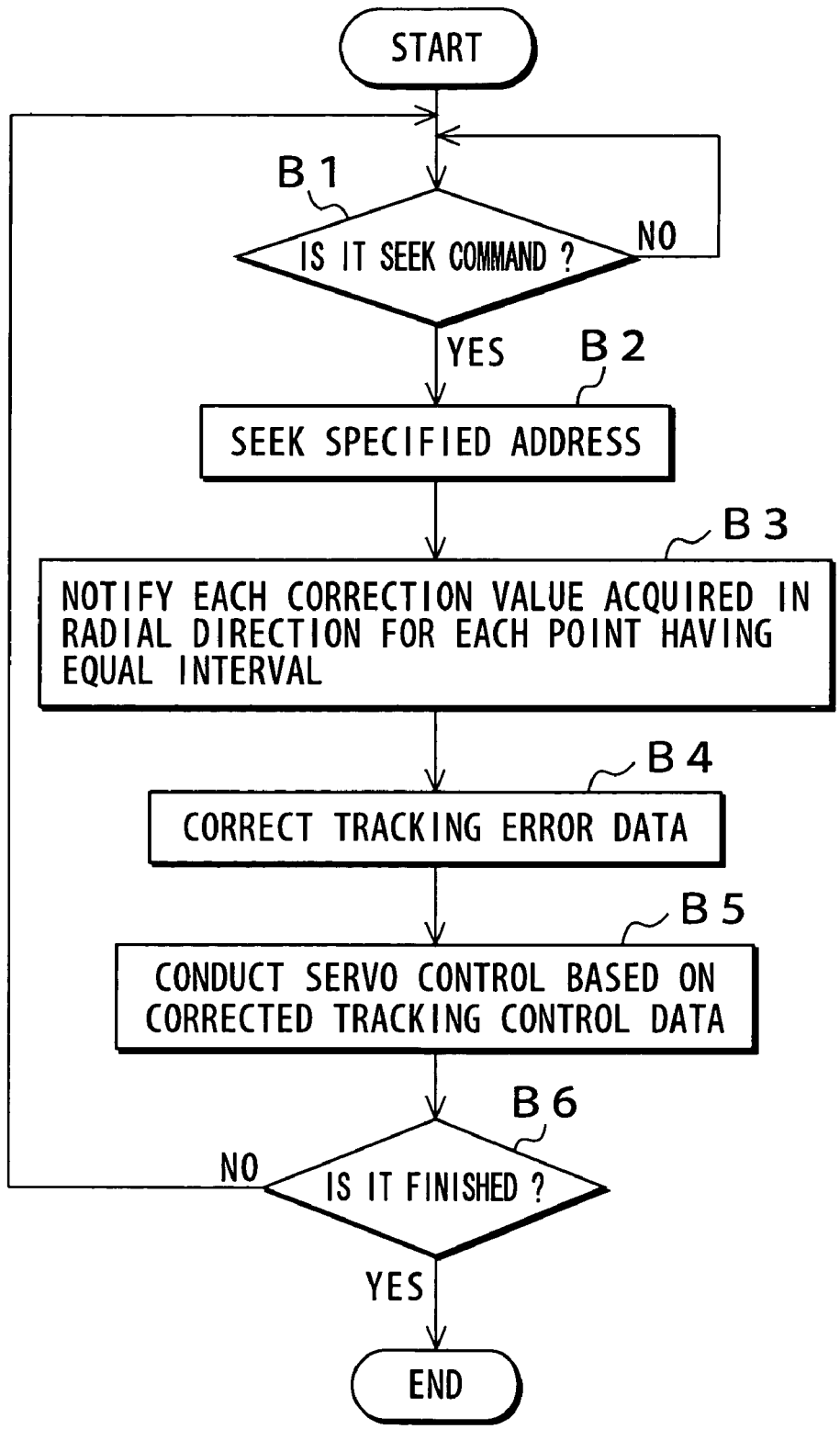
FIG. 13 is a flowchart for showing an example of control when the optical pickup is actually operating in the optical disc-driving apparatus.
Figure 14:
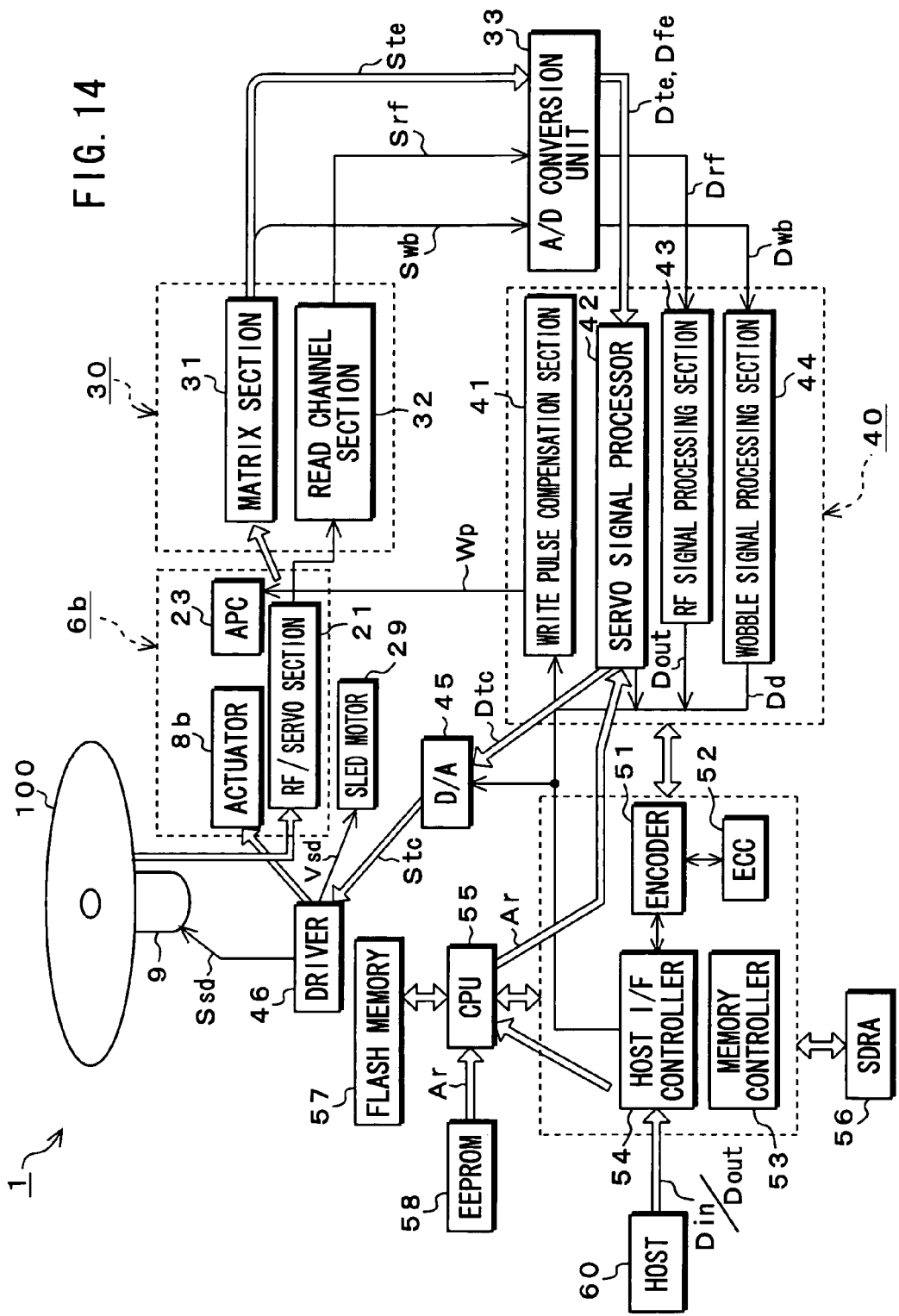
FIG. 14 is a block diagram for showing a flow of data when the pickup is actually operating.

FIG. 13 is a flowchart for showing an example of control when the optical pickup 6b is actually operating in the optical disc-driving apparatus 1. FIG. 14 shows a flow of data when the optical pickup 6b is actually operating.

In the present embodiment, when the optical pickup is actually operating, the tracking error signal Ste is corrected through the approximation using a line or the approximation of a curve itself by use of correction values Ar acquired at equal interval in the radial direction. The correction values Ar (coefficients) have been written beforehand into the EEPROM 58 shown in FIG. 10. Such a case is premised that when the optical pickup 6b seeks an address corresponding to a desired radial position, the tracking error signal Ste detected at a position of that address may be corrected using the correction value Ar, which is read from the EEPROM 58, corresponding to that position.

In such actual operation condition, at step B1 in the flowchart shown in FIG. 13, the CPU 55 waits for a seek command. The host computer 60 shown in FIG. 14 notifies the CPU 55 of the seek command. If the CPU 55 receives the seek command from the host computer 60, the process goes to step B2 where the CPU 55 controls the servo DSP 40 so that the objective lens 14b of the optical pickup 6b may be sought to a specified address.

In this case, in the servo DSP 40 shown in FIG. 14 the servo signal processor 42 drives the sled motor 29 so that the optical pickup 6b may be sought to an address that corresponds to a specified radial position in a condition where the tracking servo control function is activated. For example, the servo signal processor 42 outputs to the D/A conversion section 45 tracking control data Dtc used to control the objective lens 14b in the optical pickup 6b so that a laser beam irradiation position may come to a middle position of a desired track T. The D/A conversion section 45 performs digital/analog conversion on the tracing control data Dtc and outputs the tracking control signal Stc to the driver 46.

The driver 46 generates the sled drive voltage Vsd based on the tracking control signal Stc and supplies this sled drive voltage Vsd to the sled motor 29. The sled motor 29 moves the optical pickup 6b based on the sled drive voltage Vsd and stops it at a specified position (address). The APC section 23 automatically controls power of the light-emitting element 19 based on the write pulse signal Wp.

Further, at step B3, the CPU 55 reads from the EEPROM 58 each correction value Ar acquired in a radial direction of the disc-shaped recording medium 100 for each point having equal interval, the correction value Ar corresponding to an address to be accessed in the disc-shaped recording medium 100, and transmits the correction value Ar to the servo signal processor 42. At step B4, the servo signal processor 42 corrects the tracking error data Dte based on the correction value Ar received from CPU 55 in a radial direction thereof for each point having equal interval. For example, the RF/servo section 21 shown in FIG. 14 detects the tracking error signal Ste and outputs it via the matrix section 31 in the analog signal processing unit 30 to the A/D conversion unit 33. The A/D conversion unit 33 performs analog/digital conversion on the tracing error signal Ste and outputs the tracking error data Dte to the signal processor 42. To perform correction processing on the tracking error data Dte, the signal processor 42 computes the following Equation (3):

$$\text{Post-correction signal} = Sraw \times Ar \tag{3}$$

wherein the tracking error data Dte output from the A/D conversion unit 33 to be Sraw. Accordingly, in a case where the objective lens 14b arranged on a scanning line excluding the central axis of revolution generates the tracking error signal Ste according to the five-spot DPP method, it is possible to correct, by using the correction value Ar, the tracking error signal Ste that occurs in accordance with a radial position of the disc-shaped recording medium 100. The corrected tracking control data Dtc is output to the D/A conversion section 45.

Next, at step B5, the CPU 55 conducts any servo control based on the corrected tracking error data Dte. For example, in the optical pickup 6b, the actuator 8b drives the objective lens 14b in two-axis (X, Y) direction based on an actuator drive voltage output from the driver 46. Thus, the optical pickup 6b is controlled into such condition that data may be read optimally from the disc-shaped recording medium 100. The APC section 23 automatically controls power of the light-emitting element 19 based on the write pulse signal Wp.

Further, the driver 46 generates a focus control signal Sfd based on the focus control signal Sfc and supplies this focus drive signal Sfd to the actuator 8b in the optical pickup 6b to control a position of the objective lens 14b, thereby conducting control so that a laser beam spot may be focused to a middle position of a desired track T. It is thus possible to conduct tracking servo control by using the corrected tracking control signal Stc.

Then, at step B6, the CPU 55 decides whether tracking servo control is finished. For example, if detecting power-off information, the CPU 55 finishes the tracking servo control. If detecting no power-off information, the process returns to the step Bi where the above-described processing repeats.

In such a manner, by the optical disc-driving apparatus 1 according to the first embodiment, plural correction values Ar obtained by detecting fluctuations in amplitude of the tracking error signal Ste with respect to the radial direction of the disc-shaped recording medium 100 or a de-tracking quantity respect to the radial direction thereof are stored in the EEPROM 58 beforehand. Based on this premise, when the optical pickup 6b is actually operating, the CPU 55 reads a correction value Ar at its seek position from the EEPROM 58, corrects the tracking error data Dte at that position, and conducts any tracking servo control based on the corrected tracking control data Dtc.

Therefore, it is possible to correct the tracking error signal Ste generated in accordance with the five-spot DPP method by the objective lens 14b of the optical pickup 6b arranged on a scanning line excluding the central axis of revolution. It is thus possible to suppress fluctuation in amplitude of the tracking error signal caused by this optical pickup 6b, thereby obtaining stable performance and reliabilities about tracking servo control even if the optical pickup 6b is arranged on a scanning line excluding the central axis of revolution. This allows to be provided an optical disc-driving apparatus that is accommodated to three wavelengths for a Blu-ray Disc, a DVD, and a CD.

Second Embodiment

Figure 15A:
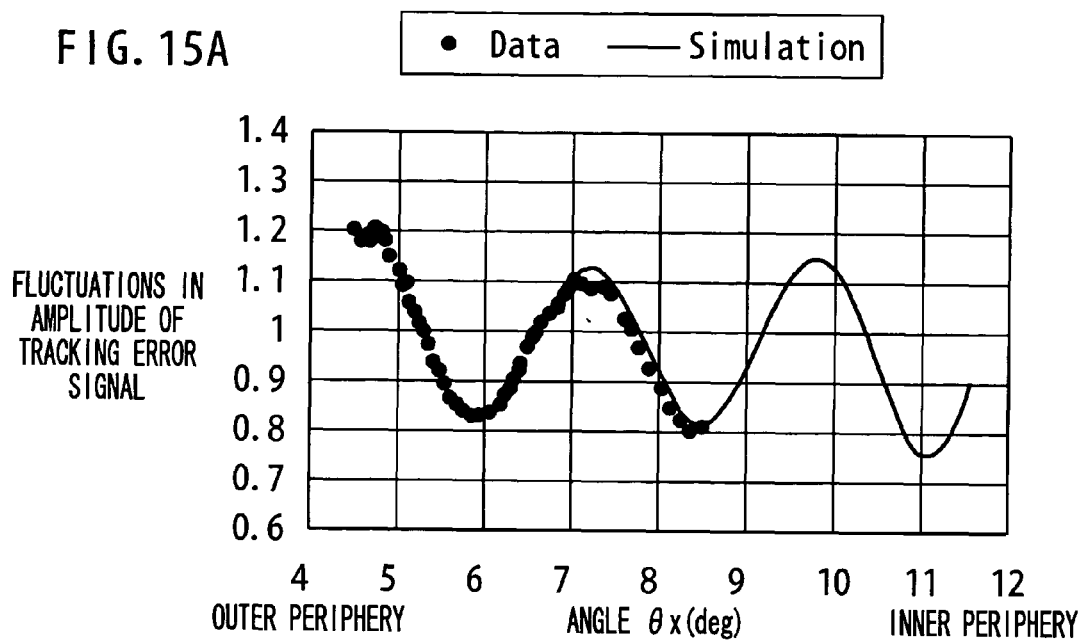
FIG. 15A is a waveform chart for showing an example of fluctuations in amplitude of a tracking error signal versus optical system angle θx and FIG. 15B is a drawing for showing an example of a seek position, respectively, according to a second embodiment.
Figure 15B:
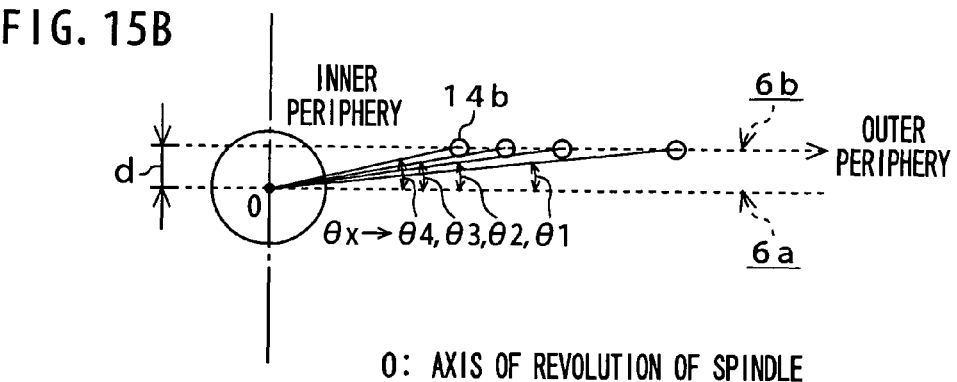

FIG. 15A shows an example of fluctuations in amplitude of a tracking error signal versus optical system angle θx and FIG. 15B shows an example of a seek position, respectively, according to a second embodiment.

In FIG. 15A, a horizontal axis represents optical system angle θx in degree [deg] units. The optical system angle θx is formed between a line segment interconnecting a central axis (center) of revolution of a spindle and an optical axis (center) of the objective lens 14a in the optical pickup 6a arranged on its seek axis and a line segment interconnecting the central axis (center) of revolution of the spindle and an optical axis (center) of the objective lens 14b in the optical pickup 6b arranged outside the seek axis. The optical system angle θx is calculated by θx=tan$^{-1}$d/r, where d is a distance between a scanning axis (line) of the optical pickup 6a and a scanning axis (line) of the optical pickup 6b and r is a radial position at the time of seeking with respect to the axis of revolution of the spindle.

A value of this optical system angle θx changes as the optical pickup 6b moves from an inner periphery side to an outer periphery side or vice versa and has a relationship of becoming smaller as this pickup moves from the inner periphery side to the outer periphery side. Further, a vertical axis shows a quantity of fluctuations in amplitude of a tracking error signal in the optical pickup 6b. In the figure, solid circles represent actually measured data and a solid line represents a result of simulation. In this example, it can be seen that an amplitude of a tracking error signal fluctuates by about ±20% from an inner periphery value (angle θx=12 deg) to an outer periphery value (angle θx=4 deg).

It has been made clear through simulation and actual measurement that a fluctuation level, a fluctuation cycle, etc. in an amplitude of this tracking error signal fluctuate due to factors (i) through (iv) relating to the optical pickup 6b and the drive as described with the first embodiment.

FIG. 15B shows an example of a seek position of the objective lens 14b of the optical pickup 6b. Similar to the first embodiment, a scanning axis of the optical pickup 6b shown in FIG.15B is set away from the scanning axis of the optical pickup 6a by distance d. For example, points where correction values Ad are to be acquired are set to respective points obtained by evenly dividing (by 1 deg, for example) optical system angle θx of the optical pickup 6b. Of course, the present invention is not limited to it. The present embodiment exemplifies a seek position of the objective lens 14b in the optical pickup 6b in a case where the optical system angle θx represents θ1=6 deg, θ2=8 deg, θ3=10 deg, and θ4=12 deg. These seek positions are correlated with addresses.

For example, addresses add1, add2, add3, . . . are assigned respectively to radial positions r1, r2, r3, . . . at the time of seeking with respect to an axis of revolution of the spindle at the time of seeking of the optical pickup 6a. Addresses add1', add2', add3', . . . are assigned respectively to optical system angles θ1, θ2, θ3, . . . at the time of seeking of the optical pickup 6b. A correction coefficient is calculated on the basis of correction values Ad (amplitude values) of points acquired at the optical system angles θ1, θ2, θ3, . . . to which the addresses are assigned.

Figure 16:
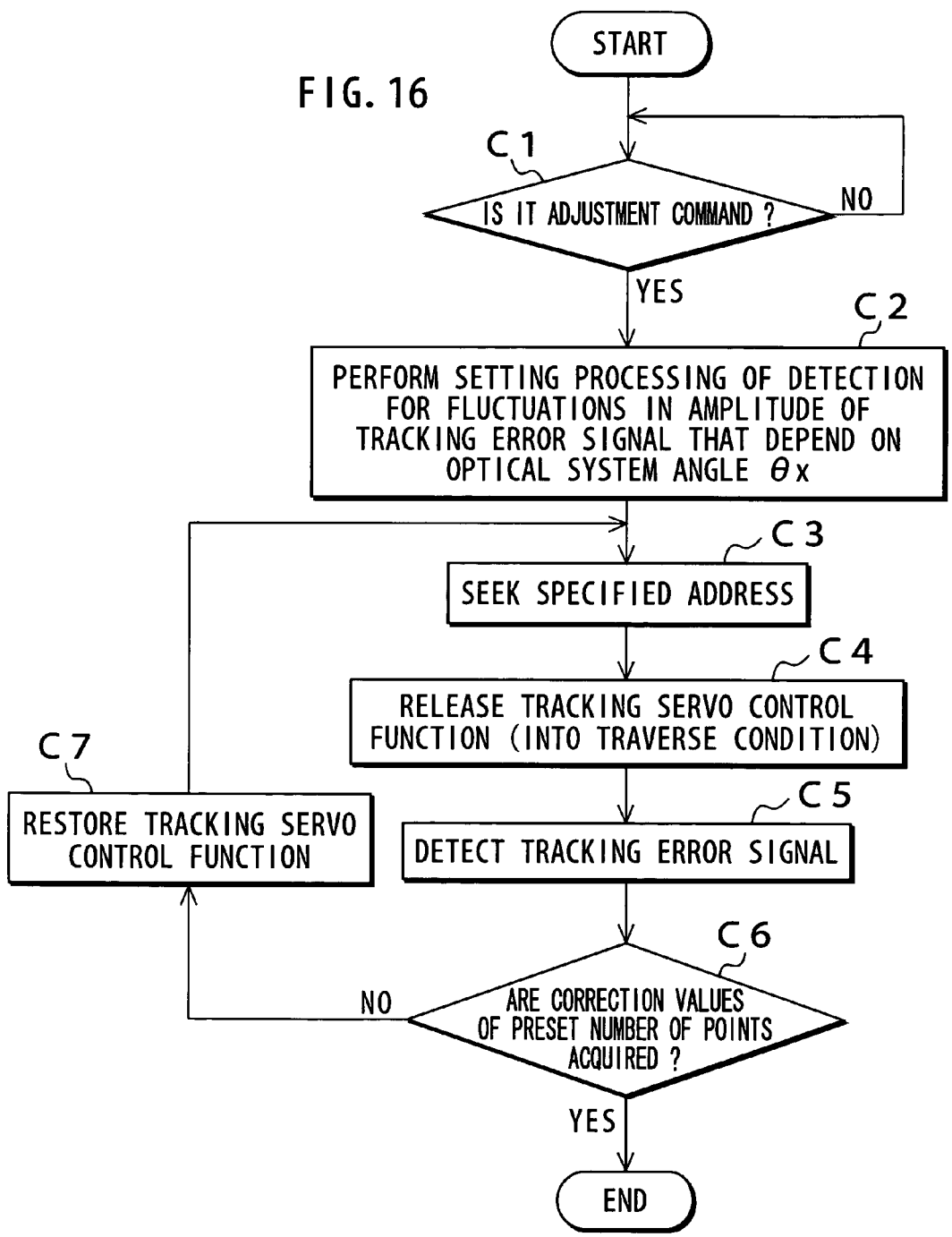
FIG. 16 is a flowchart for showing an example of control in adjustment of the optical pickup in the optical disc-driving apparatus.

FIG. 16 is a flowchart for showing an example of control in adjustment of the optical pickup 6b in the optical disc-driving apparatus 1.

In the present embodiment, factors (i) through (iv) of a fluctuation level, a fluctuation cycle, etc. in amplitude of a tracking error signal described with respect to FIG. 5 are peculiar to each of drives unless characteristics of the optical pickup 6b change. Based on this premise, in a process of adjusting the optical pickup 6b during manufacture of the drive, fluctuations in amplitude of a tracking error signal Ste that depend on optical system angle θx formed between a line segment interconnecting the central axis(center) of revolution of the spindle and the optical axis (center) of the objective lens 14a in the optical pickup 6a arranged on its seek axis and a line segment interconnecting the central axis (center) of revolution of the spindle and the optical axis (center) of the objective lens 14b in the optical pickup 6b arranged outside the seek axis are detected (grasped), so that based on the amplitude fluctuations thus detected, a correction value Ad (coefficient) is acquired.

Relative to the tracking error signal Ste, correction values Ad are acquired by setting (fixing) points for acquiring the correction values at an equal angle. For example, the points for acquiring the correction values Ad are set to respective points obtained by evenly dividing by, for example, 1 deg an optical system angle θx of the optical pickup 6b between an inner periphery maximum angle and an outer periphery minimum angle as shown in FIG. 15B. Of course, the present invention is not limited to it. These seek positions are correlated with addresses. The present embodiment exemplifies a case where a correction value Ad of the tracking error signal Ste is acquired for each unit angle.

Based on these premises, at step C1 of the flowchart shown in FIG. 16, the process first waits for an adjustment command for the optical pickup 6b. The host computer 60 shown in FIG. 10 notifies the CPU 55 of the adjustment command. If the CPU 55 receives the adjustment command from the host computer 60, the process goes to step C2 where the CPU 55 performs setting processing of detection for fluctuations in amplitude of the tracking error signal that depend on the optical system angle θx. In this setting processing of detection, for example, the points for acquiring the correction values are set to respective points obtained by evenly dividing by 1 deg an optical system angle θx of the optical pickup 6b between an inner periphery maximum angle thereof and an outer periphery minimum angle thereof.

Next, the process goes to step C3 where the CPU 55 seeks a specified address in condition where a tracking servo control function is activated. For example, the CPU 55 drives the sled motor 29 so that the optical pickup 6b may be sought to an address that corresponds to a preset desired optical system angle θx.

Next, at step C4, the CPU 55 notifies the servo DSP 40 of a command that releases the tracking servo control function. When receiving this notification, for example, the servo signal processor 42 releases the tracking servo control function thereof to put the optical pickup 6b into its traverse condition.

Next, the process goes to step C5 where, for example, the RF/servo section 21 shown in FIG. 10 detects the tracking error signal Ste and outputs it to the A/D conversion unit 33 via the matrix section 31 in the analog signal processing unit 30. The A/D conversion unit 33 performs analog/digital conversion on the tracking error signal Ste and outputs tracking error data Dte to the servo signal processor 42.

The servo signal processor 42 saves in a nonvolatile memory an amplitude value of the tracking error data Dte in the traverse condition or a correction value Ad thereof. In this case, as described with the first embodiment, the correction value Ad of the tracking error data Dte is computed by the Equation (2). It is to be noted that Equation (2) is applied by replacing the correction value Ar with the correction value Ad. The correction values Ad (coefficient) thus computed are written into the EEPROM 58.

Next, the process goes to step C6 where the CPU 55 decides whether correction values Ad are acquired by as much as a preset number of acquisition points. If it comes short of the correction values of the preset number of acquisition points, the process goes to step C7 to restore the tracking servo control function, thereby putting the optical pickup 6b into non-traverse condition.

If it reaches to the correction value(s) of the preset number of acquisition points at the above-described step C6, the process ends the processing to acquire the correction value Ad of the tracking error data Dte. Accordingly, even if the optical pickup 6b generates the tracking error signal Ste according to the five-spot DPP method, it is possible to acquire plural correction values Ad based on fluctuations in amplitude of the tracking error signal Ste that depend on the optical system angle θx.

Figure 17:
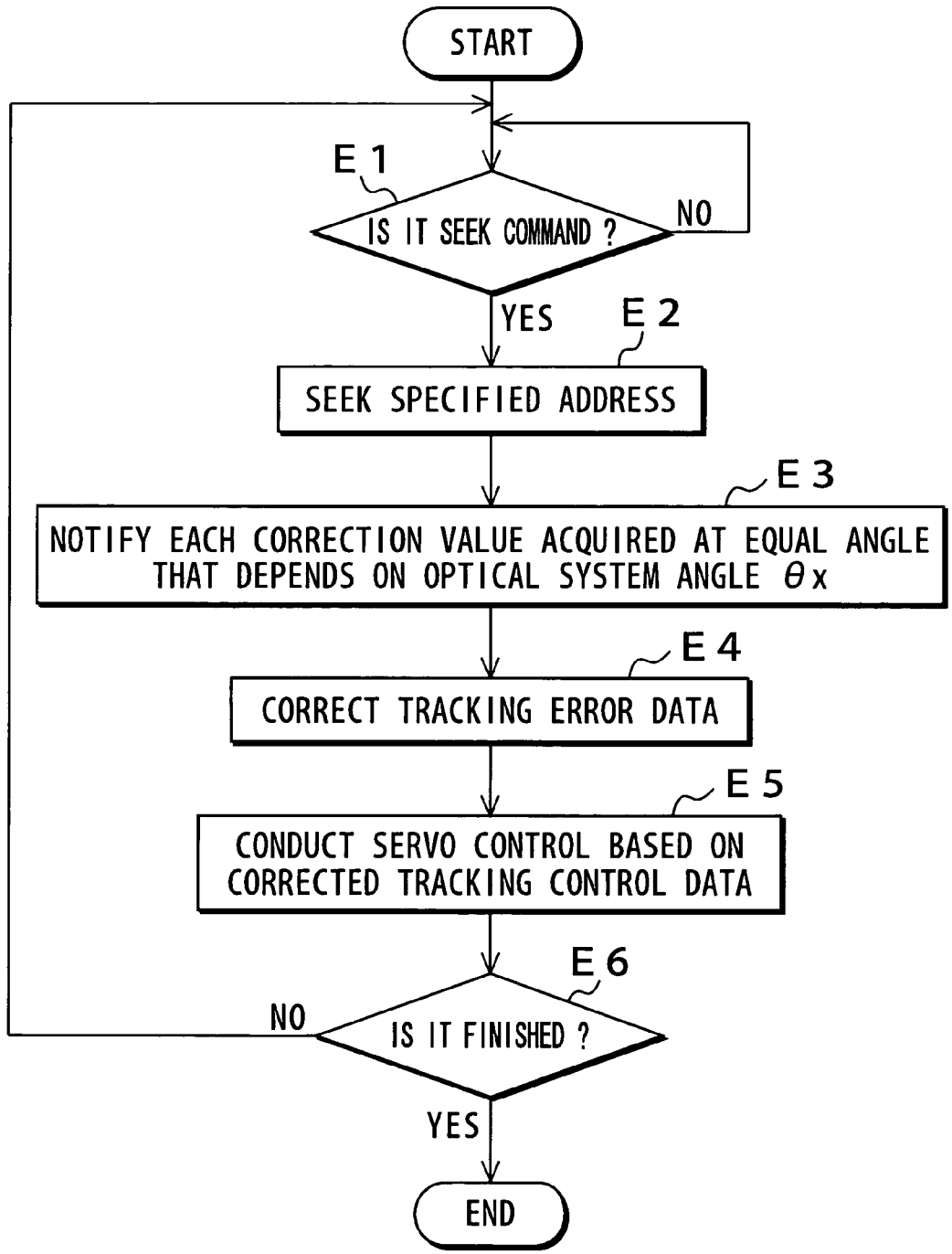
FIG. 17 is a flowchart for showing an example of control when the optical pickup is actually operating in the optical disc-driving apparatus.

FIG. 17 is a flowchart for showing an example of control during an actual operation of the optical pickup 6b in the optical disc-driving apparatus 1.

In the present embodiment, when the optical pickup is actually operating, the tracking error signal Ste is corrected through the approximation using a line or the approximation of a curve itself by use of correction values Ad acquired at equal angle depending on the optical system angle θx. The correction values Ad (coefficients) have been written beforehand into the EEPROM 58. Such a case is premised that when the optical pickup 6b seeks an address corresponding to a desired radial position, the tracking error signal Ste detected at a position of that address may be corrected using the correction value Ad, which is read from the EEPROM 58, corresponding to that position.

In such actual operation condition, at step E1 in the flowchart shown in FIG. 17, the CPU 55 waits for a seek command. For example, the host computer 60 notifies the CPU 55 of the seek command. If the CPU 55 receives the seek command from the host computer 60, the process goes to step E2 where the CPU 55 controls the servo DSP 40 so that the objective lens 14b of the optical pickup 6b may be sought to a specified address.

In this case, the servo DSP 40 performs a seek processing to a specified address in a condition where the tracking servo control function is activated. For example, the sled motor 29 is driven so that the optical pickup 6b may be sought to an address that corresponds to a specified radial position.

Next, at step E3, the CPU 55 reads from the EEPROM 58 a correction value Ad at each equal angle which depends on optical system angle θx and corresponds to an address to be accessed of a disc-shaped recording medium 100 and transmits it to the servo signal processor 42.

Then, at step E4, the servo signal processor 42 corrects the tracking error data Dte at each equal angle depending on the optical system angle θx based on the correction value Ad which is received from the CPU 55. In the correction processing, the signal processor 42 corrects the tracking error data Dte by computing the Equation (3) described with the first embodiment. Accordingly, if the objective lens 14b moving in a scanning line excluding the central axis of revolution generates the tracking error signal Ste according to the five-spot DPP method, it is possible to correct, by using the correction value Ad, the tracking error signal Ste that occurs in accordance with a radial position of the disc-shaped recording medium 100.

Next, at step E5, the CPU 55 conducts any servo control based on the corrected tracking error data Dte. Then, at step E6, the CPU 55 decides whether the tracking servo control is finished. For example, if detecting power-off information, the CPU 55 finishes the tracking servo control. If detecting no power-off information, it returns to the step E1 to repeat the above-described processing.

In such a manner, by the optical disc-driving apparatus 1 according to the second embodiment, plural correction values Ad obtained by detecting fluctuations in amplitude of the tracking error signal Ste at each equal angle that depends on optical system angle θx are stored in the EEPROM 58 beforehand. Based on this premise, when the optical pickup 6b is actually operating, the CPU 55 reads a correction value Ad at its seek position from the EEPROM 58, corrects the tracking error data Dte at that position, and conducts any tracking servo control based on the corrected tracking control data Dtc.

Thus, it is possible to correct the tracking error signal Ste generated in accordance with the five-spot DPP method by the objective lens 14b arranged on a scanning line excluding a central axis of revolution. It is thus possible to suppress fluctuation in amplitude of the tracking error signal caused by this optical pickup 6b, thereby obtaining stable performance and reliabilities about the tracking servo control even if the objective lens 14b is arranged on a scanning line excluding the central axis of revolution. Therefore, it is possible to provide an optical disc-driving apparatus that is accommodated to three wavelengths for a Blu-ray Disc, a DVD, and a CD.

Third Embodiment

Figure 18:
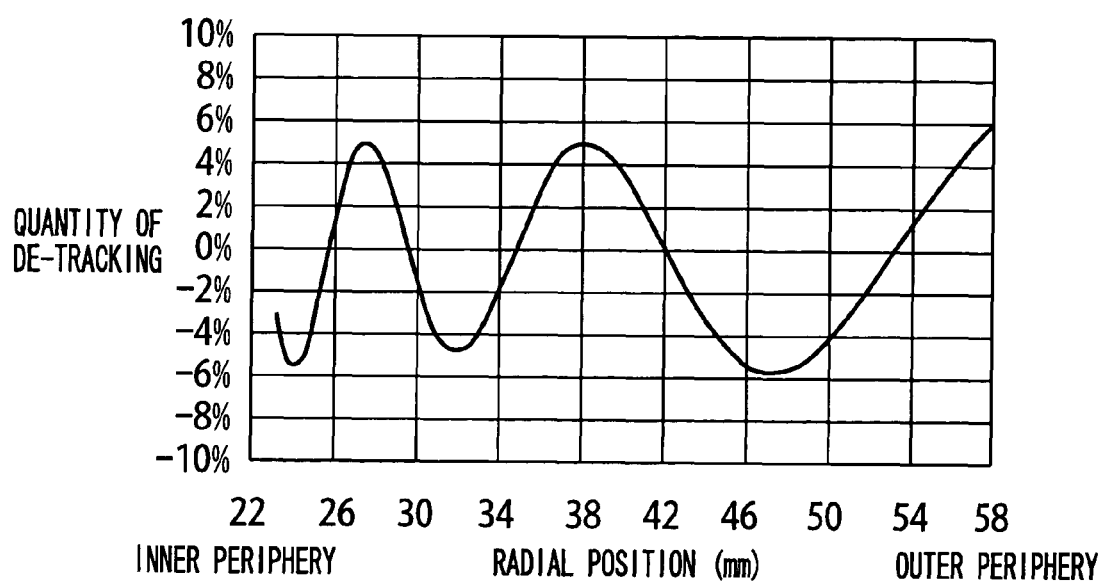
FIG. 18 is a waveform chart for showing an example of fluctuations in a quantity of de-tracking versus disc radial positions according to a third embodiment.

FIG. 18 shows an example of fluctuations in a quantity of de-tracking versus disc radial positions according to the third embodiment. In FIG. 18, a horizontal axis represents a disc radial position in millimeter units. Its vertical axis represents a quantity of de-tracking in the optical pickup 6b. In this example, it can be seen that the quantity of de-tracking fluctuates by about ±20% over a distance from an inner periphery of the disc (radial position=22 mm) to an outer periphery thereof (radial position=58 mm).

The quantity of de-tracking refers to a quantity by which a laser beam spot deviates from track T. It has been made clear through simulation and actual measurement that the quantity of de-tracking fluctuates due to a variety of factors related to an optical pickup 6b and a drive as follows:

(i) a distance (beam spacing) between a main beam and a side beam on a disc-shaped recording medium 100; (ii) a position accuracy of a diffraction grating 10; (iii) a difference in phase at the time of adjustment of a main beam and a side beam; and (iv) Apposition of an optical axis of an objective lens 14b arranged outside a seek axis, that is, a distance from a spindle (central axis).

Regarding the above factors of (i), (ii), and (iii), any fluctuation occurs during manufacturing of the optical pickup 6b while regarding the above factor of (iv), any fluctuation occurs when the optical pickup 6b is incorporated into the drive mechanism in addition to the fluctuations of the optical pickup 6b itself.

Figure 19:
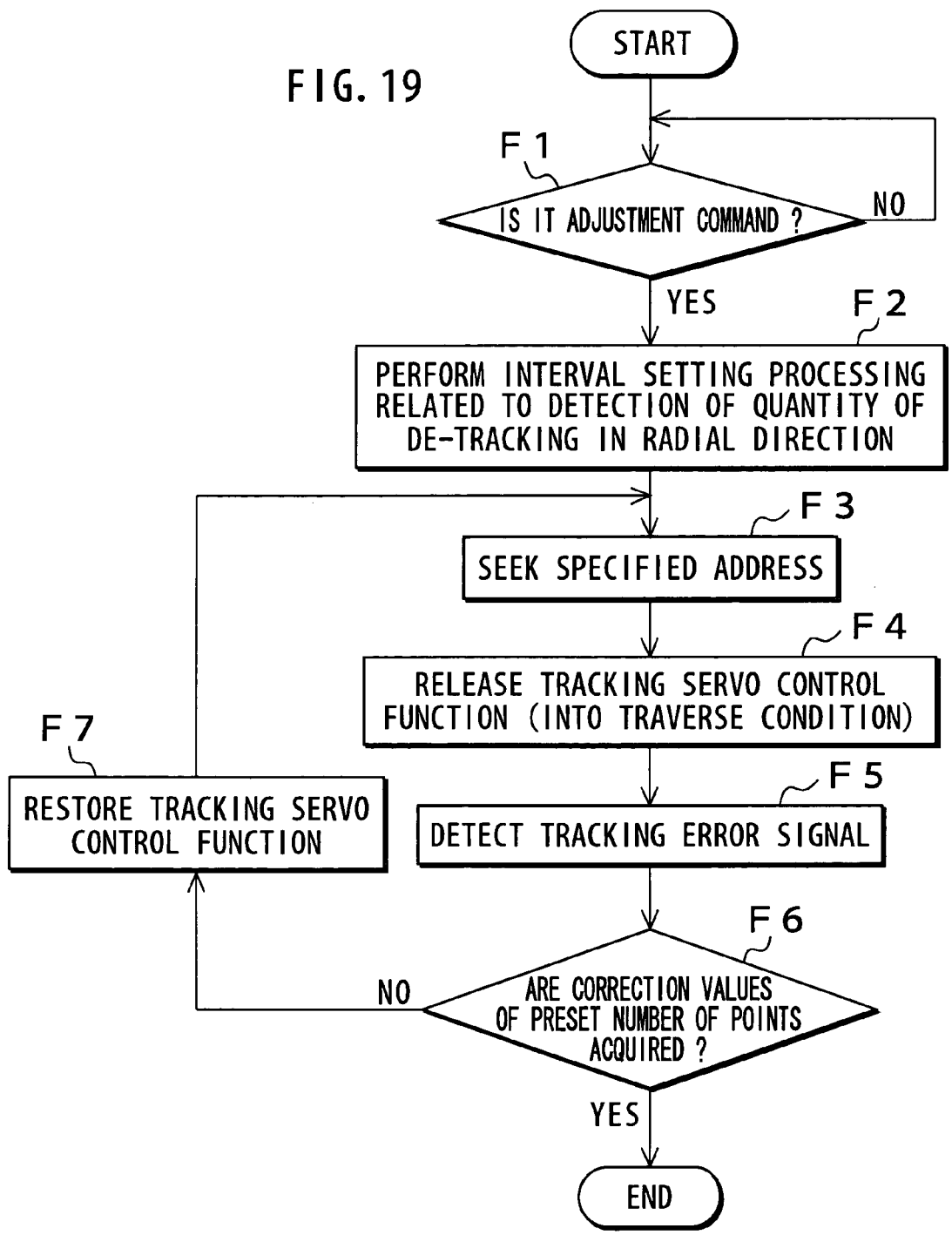
FIG. 19 is a flowchart for showing an example of control in adjustment of the optical pickup in the optical disc-drive apparatus.

FIG. 19 is a flowchart for showing an example of control in adjustment of the optical pickup 6b in an optical disc-driving apparatus 1.

In the present embodiment, fluctuations (i) through (iv) in the quantity of de-tracking described with FIG. 18 are peculiar to each drive unless characteristics of the optical pickup 6b change. Based on this premise, in a process of adjusting the optical pickup 6b when the drive is being manufactured, the quantity of de-tracking of a laser beam spot with respect to a radial direction of the disc-shaped recording medium 100 is detected (grasped) so that a correction value At (coefficient) may be acquired from the detected quantity of de-tracking.

As for the tracking error signal Ste that indicates the quantity of de-tracking, a radial length is divided into segments each having equal interval and points corresponding to the segments are set (fixed) to acquire each correction value At. For example, points where the correction values At are to be acquired are set so as to correspond to each of the points obtained by dividing by N a distance between an outer periphery maximum seek position and an inner periphery minimum seek position for the optical pickup 6b into segments each having equal space (equal interval). An address is assigned to each of these points. In this embodiment, such an example is enumerated that a correction value At for the tracking error signal Ste may be acquired for each unit interval.

Based on this premise, at step F1 of the flowchart shown in FIG. 19, the process first waits for an adjustment command for the optical pickup 6b. The host computer 60 notifies the CPU 55 of the adjustment command. If the CPU 55 receives the adjustment command from the host computer 60, the process goes to step F2 where the CPU 55 performs interval setting processing related to detection of a quantity of de-tracking in a radial direction. In this interval setting processing, for example, a correction value acquisition point is set to each of points obtained by evenly dividing by N a distance between the outer periphery maximum seek position and the inner periphery minimum seek position for the optical pickup 6b.

Next, the process goes to step F3 where the CPU 55 seeks a specified address in condition where a tracking servo control function is activated. For example, it drives the sled motor 29 based on the interval setting processing in the radial direction so that the optical pickup 6b may be sought to an address that corresponds to a desired radial position. In this case, the servo signal processor 42 outputs to the D/A conversion section 45 tracking control data Dtc used to control the objective lens 14b in the optical pickup 6b so that its laser beam irradiation position may come to a middle position of a desired track T. The D/A conversion section 45 performs digital/analog conversion on the tracking control data Dtc to produce and output the tracking control signal Stc to the driver 46.

The driver 46 generates the sled drive voltage Vsd based on the tracking control signal Stc and supplies this sled drive voltage Vsd to the sled motor 29. The sled motor 29 moves the optical pickup 6b based on the sled drive voltage Vsd and stops it at a specified position (address). The actuator 8b drives the objective lens 14b in a two-axis (X, Y) direction based on the actuator drive voltage received from the driver 46. The optical pickup 6b is controlled into such condition that data can be read from the disc-shaped recording medium 100. The APC section 23 automatically controls power of the light-emitting element 19 based on the write pulse signal Wp.

Further, the driver 46 generates the focus drive signal Sfd based on the focus control signal Sfc and supplies this focus control signal Sfd to the actuator 8b in the optical pickup 6b, thereby controlling a position of the objective lens 14b so that its laser beam spot may be focused to a middle position of a desired track T. In this case, if the laser beam spot deviates from the track T, a quantity of this deviation is reflected on the tracking error signal Ste.

Next, at step F4, the CPU 55 notifies the servo DSP 40 of a command that releases the tracking servo control function. When receiving this notification, for example, the servo signal processor 42 releases the tracking servo control function to put the optical pickup 6b into its traverse condition. The servo DSP 40 acquires an amplitude value of the tracking error signal Ste in this condition.

Next, the process goes to step F5 where, for example, the RF/servo section 21 detects the tracking error signal Ste and outputs it to the A/D conversion unit 33 via the matrix section 31 in the analog signal processing unit 30. The A/D conversion unit 33 performs analog/digital conversion on the tracking error signal Ste containing a quantity of de-tracking to produce and output tracking error data Dte to the servo signal processor 42.

The servo signal processor 42 saves in a nonvolatile memory an amplitude value of the tracking error data Dte containing the quantity of de-tracking in the traverse condition or the correction value At thereof. Supposing, in this case, the quantity of de-tracking in the tracking error data Dte to be St' and a standard quantity of de-tracking in the tracking error data provided to the servo signal processor 42 to be Sr', a track bias correction value At of the quantity of de-tracking is computed by the following Equation (4):

$$At = Sr'/St' \quad (4)$$

This computation is performed by the CPU 55 or the servo signal processor 42. For example, track bias correction values At (coefficient) computed by the servo signal processor 42 are written into the EEPROM 58.

Next, the process goes to step F6 where the CPU 55 decides whether track bias correction values At are acquired by as much as a preset number of points. If it comes short of the correction values of the preset number of acquisition points, the process goes to step F7 to restore the tracking servo control function, thereby putting the optical pickup 6b into non-traverse condition thereof. Then, the process returns to step F3 to continue processing for acquiring the track bias correction values At. These operations are repeated as many as the preset number of acquisition points.

If it reaches to the correction values of the preset number of acquisition points at the above-described step F6, the process ends the processing to acquire the track bias correction values At of the tracking error data Dte containing the quantity of de-tracking. Accordingly, in a case where the optical pickup 6b generates the tracking error signal Ste according to the five-spot DPP method, it is possible to acquire plural track bias correction values At based on fluctuations in a quantity of de-tracking generated in accordance with a radial position (with respect to a radial direction) of the disc-shaped recoding medium 100.

Figure 20:
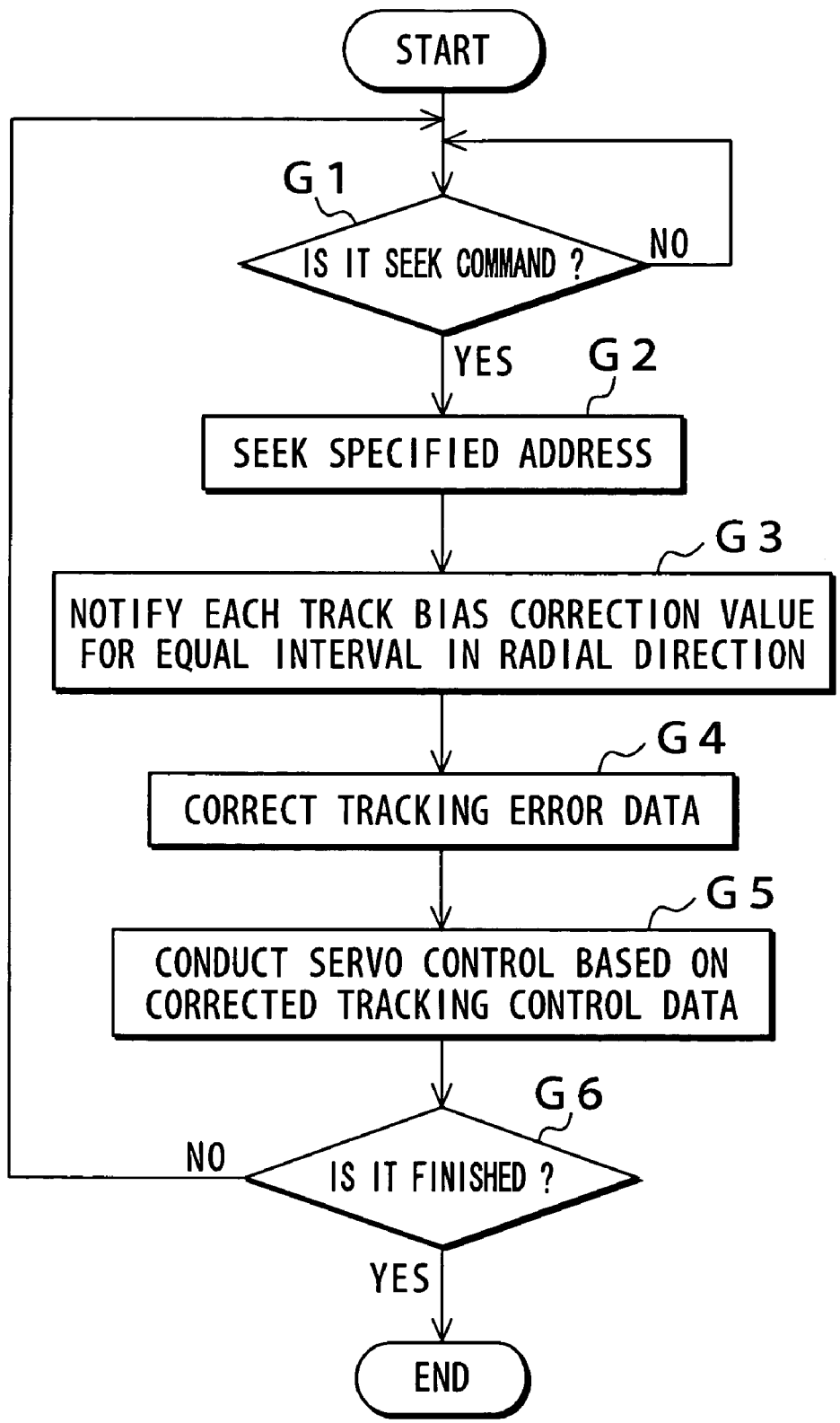
FIG. 20 is a flowchart for showing an example of control when the optical pickup is actually operating in the optical disc-driving apparatus.

FIG. 20 is a flowchart for showing an example of control during an actual operation of the optical pickup 6b in the optical disc-driving apparatus 1.

In the present embodiment, when the optical pickup is actually operating, a quantity of de-tracking contained in the tracking error signal Ste is corrected through the approximation using a line or the approximation of a curve itself by use of the track bias correction value At acquired at equal interval in the radial direction. The correction values At (coefficients) have been written beforehand into the EEPROM 58. Such a case is premised that when the optical pickup 6b seeks an address corresponding to a desired radial position, the tracking error signal Ste containing the quantity of de-tracking, which is detected at a position of that address, may be corrected using the correction value At, which is read from the EEPROM 58, corresponding to that position.

In such actual operation condition, at step G1 in the flowchart shown in FIG. 13, the CPU 55 waits for a seek command. The host computer 60 notifies the CPU 55 of the seek command. If the CPU 55 receives the seek command from the host computer 60, the process goes to step G2 where the CPU 55 controls the servo DSP 40 so that the optical pickup 6b may be sought to a specified address.

In this case, the servo DSP 40 drives the sled motor 29 so that the objective lens 14b of the optical pickup 6b may be sought to an address that corresponds to a specified radial position in condition where the tracking servo control function is activated. Further, at step G3, the CPU 55 reads from the EEPROM 58 a track bias correction value At for each equal interval in the radial direction that corresponds to an address to be accessed of the disc-shaped recording medium 100 and transmits it to the servo signal processor 42. At step G4, the servo signal processor 42 corrects the tracking error data Dte containing the quantity of de-tracking based on the track bias correction value At for each equal interval in the radial direction, which is received from the CPU 55. For example, the RF/servo section 21 detects the tracking error signal Ste containing the quantity of de-tracking and outputs it via the matrix section 31 in the analog signal processing unit 30 to the A/D conversion unit 33. The A/D conversion unit 33 performs analog/digital conversion on the tracing error signal Ste to produce and output the tracking error data Dte to the signal processor 42. The signal processor 42 computes the following Equation (5):

$$\text{Corrected signal} = Sraw \times At \tag{5}$$

where the tracking error data Dte containing the quantity of de-tracking output from the A/D conversion unit 33 is to be Sraw, to perform correction processing on the tracking error data Dte. Accordingly, in a case where the objective lens 14b arranged on a scanning line excluding the central axis of revolution generates the tracking error signal Ste according to the five-spot DPP method, it is possible to correct, by using the track bias correction values At, the tracking error signal Ste that occurs in accordance with a radial position of the disc-shaped recording medium 100. The corrected tracking control data Dtc is output to the D/A conversion section 45.

Next, at step G5, the CPU 55 conducts any servo control based on the corrected tracking error data Dte. For example, in the optical pickup 6b, the actuator 8b drives the objective lens 14b in two-axis (X, Y) direction based on the actuator drive voltage received from the driver 46. The optical pickup 6b is controlled into such condition that data may be read optimally from the disc-shaped recording medium 100. The APC section 23 automatically controls power of the light-emitting element 19 based on the write pulse signal Wp.

Further, the driver 46 generates the focus control signal Sfd based on the focus control signal Sfc and supplies this focus drive signal Sfd to the actuator 8b in the optical pickup 6b, to control a position of the objective lens 14b conducting control so that a laser beam spot may be focused to a middle position of a desired track T. It is thus possible to conduct any tracking servo control by using the corrected tracking control signal Stc.

Then, at step G6, the CPU 55 decides whether the tracking servo control is finished. For example, if detecting power-off information, the CPU 55 ends the tracking servo control. If receiving no power-off information, it returns to step G1 to repeat the above-described processing.

In such a manner, by the optical disc-driving apparatus 1 according to the third embodiment, plural track bias correction values At obtained by detecting quantities of de-tracking in the tracking error signal Ste with respect to a radial direction of the disc-shaped recording medium 100 are stored in the EEPROM 58 beforehand. Based on this premise, when the optical pickup 6b is actually operating, the CPU 55 reads a track bias correction value At at its seek position from the EEPROM 58, corrects the tracking error data Dte at that position, and conducts any tracking servo control based on the corrected tracking control data Dtc.

Thus, it is possible to correct the tracking error signal Ste generated in accordance with the five-spot DPP method by the objective lens 14b of the optical pickup 6b arranged on a scanning line excluding a central axis of revolution. It is thus possible to suppress fluctuation in the quantity of de-tracking caused by this optical pickup 6, thereby obtaining stable performance and reliabilities about the tracking servo control even if the objective lens 14b is arranged on a scanning line excluding the central axis of revolution. Therefore, it is possible to provide an optical disc-driving apparatus that is accommodated to three wavelengths for a Blu-ray Disc, a DVD, and a CD.

Fourth Embodiment

Figure 21:
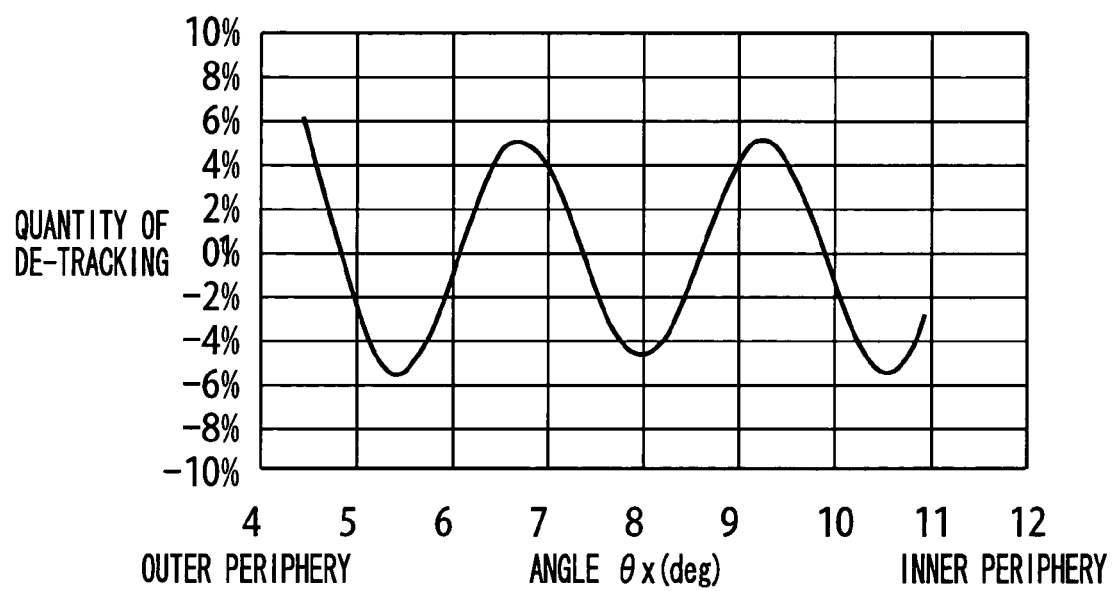
FIG. 21 is a graph for showing a quantity of de-tracking versus optical system angle θx according to a fourth embodiment.

FIG. 21 shows a quantity of de-tracking versus optical system angle θx according to the fourth embodiment. In FIG. 21, a horizontal axis represents optical system angle θx in degree [deg] units. The optical system angle θx is formed between a line segment interconnecting a central axis (center) of revolution of a spindle and an optical axis (center) of the objective lens 14a in the optical pickup 6a arranged on its seek axis and a line segment interconnecting the central axis (center) of revolution of the spindle and an optical axis (center) of the objective lens 14b in the optical pickup 6b arranged outside the seek axis. A value of this optical system angle θx changes as the optical pickup 6b moves from an inner periphery side thereof to an outer periphery side thereof or vice versa and has a relationship of becoming smaller as this pickup moves from the inner periphery side to the outer periphery side.

Further, its vertical axis shows a quantity (percentage) of de-tracking of a laser beam spot in the optical pickup 6b. In this example, it can be seen that a quantity of de-tracking fluctuates by about ±20% from an inner periphery value (angle θx=12 deg) to an outer periphery value (angle θx=4 deg). It has been made clear through simulation and actual measurement that this quantity of de-tracking of the laser beam spot fluctuates due to factors (i) through (iv) relating to the optical pickup 6b and a drive as described with the first embodiment.

Figure 22:
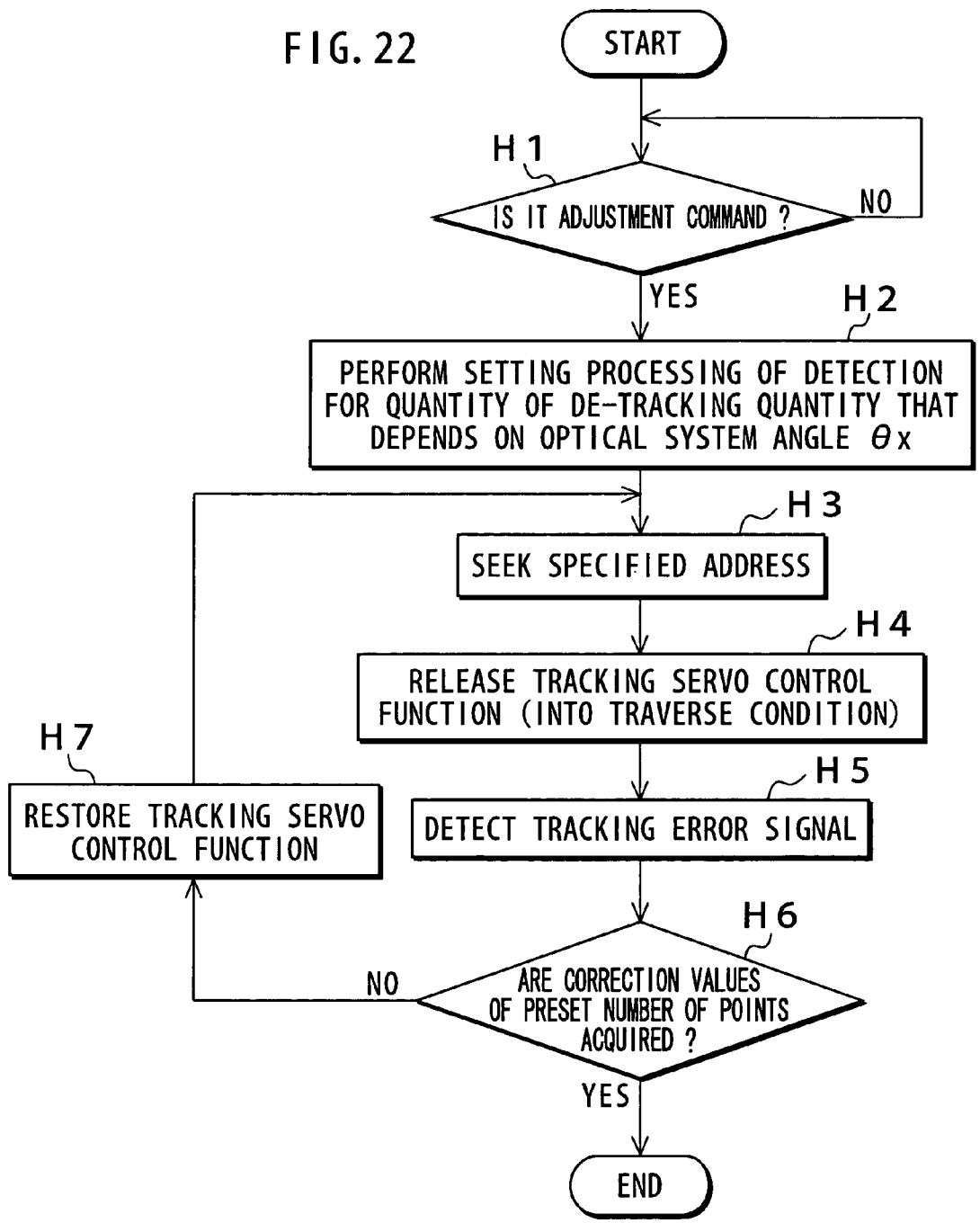
FIG. 22 is a flowchart for showing an example of control in adjustment of the optical pickup in the optical disc-driving apparatus.

FIG. 22 is a flowchart for showing an example of control in adjustment of the optical pickup 6b in the optical disc-driving apparatus 1.

In the present embodiment, the factors (i) through (iv) of fluctuations in a quantity of de-tracking of a laser beam spot are peculiar to each of the drives unless characteristics of the optical pickup 6b change. Based on this premise, in a process of adjusting the optical pickup 6b during manufacture of the drive, fluctuations in the quantity of de-tracking that depend on optical system angle θx formed between a line segment interconnecting the central axis (center) of revolution of the spindle and the optical axis (center) of the objective lens 14a in the optical pickup 6a arranged on its seek axis and a line segment interconnecting the central axis (center) of revolution of the spindle and the optical axis (center) of the objective lens 14b in the optical pickup 6b arranged outside the seek axis are detected (grasped), so that based on the detected fluctuations in the quantity of de-tracking, track bias correction values At' (coefficients) are acquired.

Relative to the quantity of de-tracking contained in the tracking error signal Ste, the track bias correction values At' are acquired by setting (fixing) points for acquiring the track bias correction values at an equal angle. For example, the points for acquiring the track bias correction values At' are set to respective points obtained by evenly dividing by, for example, 1 deg an optical system angle θx of the optical pickup 6b between an inner periphery maximum angle and an outer periphery minimum angle. Of course, the present invention is not limited to it. These seek positions are correlated with addresses. The present embodiment exemplifies a case where a track bias correction value At' of the tracking error signal Ste is acquired for each unit angle.

Based on these premises, at step H1 of the flowchart shown in FIG. 22, the process first waits for an adjustment command for the optical pickup 6b. The host computer 60 notifies the CPU 55 of the adjustment command. If the CPU 55 receives the adjustment command from the host computer 60, the process goes to step H2 where the CPU 55 performs setting processing of detection for a quantity of de-tracking that depends on optical system angle θx. In the setting processing of detection, for example, the points for acquiring the correction values are set to respective points obtained by evenly dividing by 1 deg an optical system angle θx of the optical pickup 6b between an inner periphery maximum angle thereof and an outer periphery minimum angle thereof.

Next, the process goes to step H3 where the CPU 55 seeks a specified address in condition where a tracking servo control function is activated. For example, it drives the sled motor 29 so that the optical pickup 6b may be sought to an address that corresponds to a preset desired optical system angle θx.

Next, at step H4, the CPU 55 notifies the servo DSP 40 of a command that releases the tracking servo control function. When receiving this notification, for example, the servo signal processor 42 releases the tracking servo control function to put the optical pickup 6b into traverse condition.

Next, the process goes to step H5 where, for example, the RF/servo section 21 detects the tracking error signal Ste and outputs it to the A/D conversion unit 33 via the matrix section 31 in the analog signal processing unit 30. The A/D conversion unit 33 performs analog/digital conversion on the tracking error signal Ste and outputs tracking error data Dte to the servo signal processor 42.

The servo signal processor 42 saves in a nonvolatile memory quantities of de-tracking obtained from tracking error data Dte in the traverse condition or track bias correction values At' thereof. In this case, as described with the third embodiment, the track bias correction values At' of the quantities of de-tracking are computed by the Equation (4). The track bias correction values At' (coefficients) thus computed are written into the EEPROM 58.

Next, the process goes to step H6 where the CPU 55 decides whether track bias correction values At' are acquired by as much as a preset number of points. If it comes short of track bias correction values of preset number of acquisition points, the process goes to step H7 to restore the tracking servo control function, thereby putting the optical pickup 6b into non-traverse condition.

If it reaches to track bias correction values of the preset number of acquisition points at the above-described step H6, the process ends the processing to acquire the track bias correction value At' of the tracking error data Dte. Accordingly, even if the optical pickup 6b generates the tracking error signal Ste according to the five-spot DPP method, it is possible to acquire plural track bias correction values At' based on fluctuations in the quantity of de-tracking of the tracking error signal Ste that depend on optical system angle θx.

Figure 23:
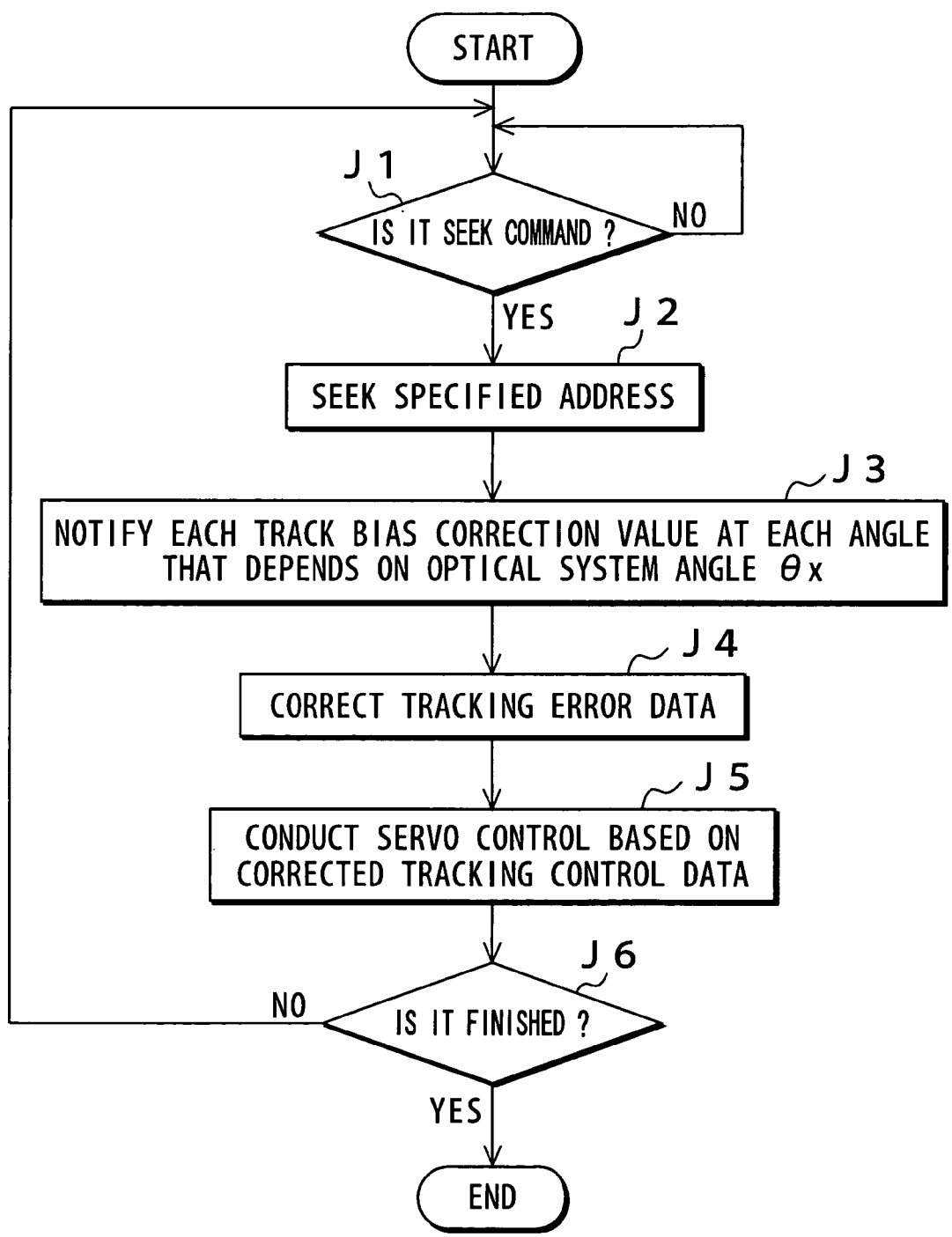
FIG. 23 is a flowchart for showing an example of control when the optical pickup is actually operating in the optical disc-driving apparatus.

FIG. 23 is a flowchart for showing an example of control during an actual operation of the optical pickup 6b in the optical disc-driving apparatus 1.

In the present embodiment, when the optical pickup is actually operating, the tracking error signal Ste is corrected through the approximation using a line or the approximation of a curve itself by use of the track bias correction values At' acquired at equal angle depending on the optical system angle θx. The correction values At' (coefficients) have been written beforehand into the EEPROM 58. Such a case is premised that when the optical pickup 6b seeks an address corresponding to a desired radial position, a quantity of de-tracking contained in the tracking error signal Ste detected at a position of that address may be corrected using the track bias correction value At', which is read from the EEPROM 58, corresponding to that position.

In such actual operation condition, at step J1 in the flowchart shown in FIG. 23, the process waits for a seek command. The host computer 60 notifies the CPU 55 of the seek command. If the CPU 55 receives the seek command from the host computer 60, the process goes to step J2 where the CPU 55 controls the servo DSP 40 so that the optical pickup 6b may be sought to a specified address. In this case, the servo DSP 40 seeks a specified address in condition where the tracking servo control function is activated. For example, it drives the sled motor 29 so that the optical pickup 6b may be sought to an address that corresponds to a specified radial position.

Next, at step J3, the CPU 55 reads from the EEPROM 58 a track bias correction value At' at each equal angle which depends on optical system angle θx and corresponds to an address to be accessed of a disc-shaped recording medium 100 and transmits it to the servo signal processor 42.

Then, at step J4, the servo signal processor 42 corrects the tracking error data Dte based on the track bias correction value At', for each equal angle, received from the CPU 55 that depends on the optical system angle θx. In the correction processing, the signal processor 42 corrects the quantity of de-tracking contained in the tracking error data Dte by computing the Equation (5) described with the third embodiment. Accordingly, in a case where the objective lens 14b arranged on a scanning line excluding the central axis of revolution generates the tracking error signal Ste according to the five-spot DPP method, it is possible to correct, by using the track bias correction values At', the tracking error signal Ste that occurs in accordance with a radial position of the disc-shaped recording medium 100.

Next, at step J5, the CPU 55 conducts any servo control based on the corrected tracking error data Dte. Then, at step J6, the CPU 55 decides whether tracking servo control is finished. For example, if detecting power-off information, the CPU 55 ends the tracking servo control. If receiving no power-off information, it returns to step J1 to repeat the above-described processing.

In such a manner, by the optical disc-driving apparatus 1 according to the fourth embodiment, plural track bias correction values At' obtained by detecting the quantities of de-tracking of the tracking error signal Ste at each equal angle that depends on optical system angle θx at the time of seeking of the optical pickup 6b are stored in the EEPROM 58 beforehand. Based on this premise, when the optical pickup 6b is actually operating, the CPU 55 reads a track bias correction value At' at its seek position from the EEPROM 58, corrects the tracking error data Dte at that position, and conducts any tracking servo control based on the corrected tracking control data Dtc.

Thus, it is possible to correct the tracking error signal Ste generated in accordance with the five-spot DPP method by the objective lens 14b of the optical pickup 6b arranged on a scanning line excluding a central axis of revolution. It is thus possible to suppress fluctuations in the quantity of de-tracking in this optical pickup 6b, thereby obtaining stable performance and reliabilities about tracking servo control even if the objective lens 14b is arranged on a scanning line excluding the central axis of revolution. Therefore, it is possible to provide an optical disc-driving apparatus that is accommodated to three wavelengths for a Blu-ray Disc, a DVD, and a CD.

The present invention could well be applied to a disc-driving apparatus, which is equipped with plural objective lenses and a light source for emitting lights having plural wavelengths and can perform multi-wavelength accommodating recording and reproduction alone, a method for controlling the same and an optical disc-driving apparatus. The present invention can be also applied to a disc-driving apparatus or an optical disc-driving apparatus which is equipped with an optical pickup including plural objective lenses and a light source for emitting lights having plural wavelengths.

It should be understood by those skilled in the art that various modifications, combinations, sub-combinations and alternations may occur depending on design requirements and other factors insofar as they are within the scope of the appended claims or the equivalents thereof.

What is claimed is:

1. A disc-driving apparatus, comprising:
an optical pickup including an objective lens, the objective lens having an optical axis that is met on a line excluding a central axis of revolution of a disc;
a storage device that stores plural correction values obtained by detecting any one of fluctuations in amplitude of a tracking error signal with respect to a radial direction of the disc and a quantity of de-tracking with respect to the radial direction of the disc, and the objective lens having the optical axis that is met on the line excluding the central axis of revolution of the disc generates the tracking error signal according to a five-spot DPP method; and
a control device that reads the correction value from the storage device and, when the optical pickup is operating, corrects the tracking error signal to conduct servo control based on the corrected tracking error signal.

2. The disc-driving apparatus according to claim 1 further comprising a servo signal processor that corrects, based on the correction value, the tracking error signal received when the optical pickup is operating, to conduct the servo control based on the corrected tracking error signal,
wherein the control device notifies the servo signal processor of the correction value in accordance with an address to be accessed of the disc.

3. A method for controlling a disc-driving apparatus having an optical pickup including an objective lens, the objective lens having an optical axis that is met on a line excluding a central axis of revolution of a disc, said method comprising the steps of:
obtaining plural correction values by detecting any one of fluctuations in amplitude of a tracking error signal with respect to a radial direction of the disc and a quantity of de-tracking with respect to the radial direction of the disc, and the objective lens having the optical axis that is met on the line excluding the central axis of revolution of the disc generates the tracking error signal according to a five-spot DPP method;
storing the obtained correction values in a storage device;
reading the correction value from the storage device to correct the tracking error signal when the optical pickup is operating; and
conducting servo control based on the corrected tracking error signal when the optical pickup is operating.

4. The method according to claim 3 wherein the step of obtaining the plural correction values includes sub-steps of:
moving the optical pickup including the objective lens, the objective lens having the optical axis that is met on the line excluding the central axis of revolution of the disc, to a desired position in the disc; and
releasing a tracking servo at the desired position to acquire an amplitude of the tracking error signal crossing a track,
wherein the sub-steps of moving the optical pickup to the desired position and of acquiring the amplitude of the tracking error signal are performed at any one of a timing when the optical pickup including the objective lens moves at an equal interval in a radial direction of the disc and a timing when an angle formed between a line segment including the central axis of revolution of the disc and a line segment interconnecting a position of the objective lens arranged on a line excluding the central axis of revolution of the disc and the central axis of revolution of the disc varies at an equal angle.

5. The method according to claim 3 wherein the step of obtaining the plural correction values includes a sub-step of acquiring the correction values at each equal interval in a radial direction of the disc.

6. The method according to claim 3 wherein the step of reading the correction value from the storage device to correct the tracking error signal when the optical pickup is operating includes sub-steps of acquiring the correction values by approximating the correction values at a predetermined interval in a radial direction of the disc and correcting the tracking error signal.

7. The method according to claim 3 wherein the step of obtaining the plural correction values includes a sub-step of acquiring the correction values at a timing when an angle formed between a line segment including the central axis of revolution of the disc and a line segment interconnecting a position of the objective lens arranged on a line excluding the central axis of revolution of the disc and the central axis of revolution of the disc varies at an equal angle.

8. The method according to claim 3 wherein the step of reading the correction value from the storage device to correct the tracking error signal when the optical pickup is operating includes sub-steps of approximating the correction value at a timing when an angle formed between a line segment including the central axis of revolution of the disc and a line segment interconnecting a position of the objective lens arranged on a line excluding the central axis of revolution of the disc and the central axis of revolution of the disc varies at an equal angle and correcting the tracking error signal.

9. An electronic apparatus, comprising:
a disc-driving apparatus including:
  an optical pickup including an objective lens, the objective lens having an optical axis that is met on a line excluding a central axis of revolution of a disc;
  a storage device that stores plural correction values obtained by detecting any one of fluctuations in amplitude of a tracking error signal with respect to a radial direction of the disc and a quantity of de-tracking with respect to the radial direction of the disc, and the objective lens having the optical axis that is met on the line excluding the central axis of revolution of the disc generates the tracking error signal according to a five-spot DPP method; and
  a control device that reads the correction value from the storage device and, when the optical pickup is operating, corrects the tracking error signal and conducts servo control based on the corrected tracking error signal; and
a control section for transmitting a control signal to the disc-driving apparatus.

* * * * *